US011336782B2

(12) United States Patent
Monden

(10) Patent No.: US 11,336,782 B2
(45) Date of Patent: May 17, 2022

(54) IMAGE FORMING APPARATUS FOR CREATING IMAGE INCLUDING MULTIPLE DOCUMENT IMAGES, AND IMAGE FORMING METHOD, AND RECORDING MEDIUM THEREFORE

(71) Applicant: Nobuya Monden, Kanagawa (JP)

(72) Inventor: Nobuya Monden, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/114,708

(22) Filed: Dec. 8, 2020

(65) Prior Publication Data

US 2021/0203808 A1  Jul. 1, 2021

(30) Foreign Application Priority Data

Dec. 27, 2019  (JP) .............................. JP2019-238330

(51) Int. Cl.
*H04N 1/00* (2006.01)
*H04N 1/44* (2006.01)
*G06F 3/12* (2006.01)

(52) U.S. Cl.
CPC ......... *H04N 1/0044* (2013.01); *G06F 3/1204* (2013.01); *G06F 3/1275* (2013.01); *H04N 1/444* (2013.01); *H04N 1/448* (2013.01)

(58) Field of Classification Search
None
See application file for complete search history.

(56) References Cited

U.S. PATENT DOCUMENTS

| | | | |
|---|---|---|---|
| 2003/0202199 A1* | 10/2003 | Carter | G06F 3/1239 358/1.13 |
| 2009/0003649 A1* | 1/2009 | Wakabayashi | H04N 1/00795 382/100 |
| 2018/0227446 A1* | 8/2018 | Yamamoto | H04N 1/00379 |
| 2018/0270395 A1 | 9/2018 | Yamamoto et al. | |

FOREIGN PATENT DOCUMENTS

| | | |
|---|---|---|
| JP | 2009-141427 | 6/2009 |
| JP | 2019-017003 | 1/2019 |

\* cited by examiner

*Primary Examiner* — Lennin R Rodriguezgonzalez
(74) *Attorney, Agent, or Firm* — IPUSA, PLLC

(57) ABSTRACT

An image forming apparatus includes circuitry to scan a first document, dispose an image of the scanned first document at a predetermined location in accordance with a form including an image of a second document and information on the predetermined location at which the image of the first document is to be disposed in the image of the second document, combine the disposed image of the first document and another image different from the image of the second document included in the form to generate an output image, and output the output image.

19 Claims, 23 Drawing Sheets

FIG. 7

| No. | CONTENT | EXAMPLE OF PATTERN 1 | EXAMPLE OF PATTERN 2 |
|---|---|---|---|
| 1 | APPLICATION MOUNT | (Application Document 1) WITH WATERMARK | (Application Document 1) |
| 2 | CERTIFICATE DOCUMENT | (certificate image) | (certificate image) |
| 3-1 | PREVIEW SCREEN (SERVICE MANAGER) | (Application Document 1) WITH WATERMARK | (Application Document 1) |
| 3-2 | PREVIEW SCREEN (OPERATOR) | (Application Document 1) WITH WATERMARK | (Application Document 1) FILLED IN |
| 4 | PRINTING SHEET | (Application Document 1) WITH WATERMARK | (blank) |
| 5 | PRINT DATA | (certificate only) | (Application Document 1) FILLED IN |
| 6 | PRINTED MATERIAL (PRINTED RESULT) | (Application Document 1) WITH WATERMARK | (Application Document 1) FILLED IN |

FIG. 9

| ITEM | SPECIFICATIONS |
|---|---|
| FORM NAME | REGISTERED NAME OF FORM<br>MAXIMUM NUMBER OF REGISTERABLE CHARACTERS: 40 HALF-WIDTH CHARACTERS<br>NON-BREAK CHARACTERS: NINE CHARACTERS OF <,>,:,*,?,",/,¥,\| |
| APPLICATION DOCUMENTS (UNIT: DOCUMENTS) | SPECIFICATIONS REGARDING MOUNTS/DOCUMENTS TO BE STORED ARE AS FOLLOWS.<br>NUMBER OF REGISTERABLE DOCUMENTS: 1-3 [DOCUMENTS/FORM]<br>IMAGE DATA (*1): 1 [PIECE OF DATA/DOCUMENT] |
| CERTIFICATE DOCUMENT (UNIT: DOCUMENTS) | SPECIFICATIONS REGARDING ATTACHMENTS TO BE STORED ARE AS FOLLOWS.<br>NUMBER OF REGISTERABLE ATTACHMENTS: 0-3 [ATTACHMENTS/FORM]<br>DOCUMENT NAME (*1): 1 [NAME/ATTACHMENT]<br>DOCUMENT SIZE: 1 [PIECE OF DATA/ATTACHMENT]<br>DOCUMENT DISPOSITION LOCATION: 1 [LOCATION/ATTACHMENT]<br>SCAN SETTINGS (*2): 1 [SETTING/ATTACHMENT]<br>(*1) INITIAL VALUE: NONE, NON-BREAK CHARACTERS: NONE<br>UPPER LIMIT OF NUMBER OF INPUT CHARACTERS: 40 HALF-WIDTH CHARACTERS<br>(*2) VALUE SET IN [SCAN SETTINGS] |
| MASK INFORMATION (UNIT: PORTIONS) | SPECIFICATIONS REGARDING MASK INFORMATION TO BE STORED ARE AS FOLLOWS.<br>NUMBER OF REGISTERABLE PIECES OF MASK INFORMATION: 0-10 [PORTIONS/MOUNT DOCUMENT]<br>SELECTED COLOR (*3): BLACK/WHITE [FOR EACH PORTION]<br>MASKING WIDTH: 1 [PIECE OF DATA/PORTION]<br>MASKING HEIGHT: 1 [PIECE OF DATA/PORTION]<br>MASKING POSITION: 1 [PIECE OF DATA/PORTION]<br>(*3) INITIAL VALUE: BLACK |
| WORKFLOW AT USE | PATTERN 0/PATTERN 1/PATTERN 2 |

FIG. 13

| | WHEN SIZE OF SCANNED DOCUMENT/ MOUNT IS SMALLER THAN SIZE OF FORM | WHEN SIZE OF SCANNED DOCUMENT/ MOUNT IS LARGER THAN SIZE OF FORM |
|---|---|---|
| SIZE OF DOCUMENT/ MOUNT USED IN REGISTRATION OF FORM | | |
| DOCUMENT/MOUNT SCANNED AT TIME OF LOADING OF FORM | R | R |
| DOCUMENT/MOUNT IMAGE TO BE OUTPUT | R | R |

FIG. 15

| No. | INPUT (SCAN) | | OUTPUT (PRINT/ TRANSMISSION OF ELECTRONIC DATA) | SUPPLEMENTARY NOTE |
|---|---|---|---|---|
| | MOUNT/ DOCUMENT | ATTACHMENT | | |
| 1 | BINARY | BINARY | BINARY | MULTIVALUED COMPRESSION IS NOT PERFORMED ON BINARY IMAGE |
| 2 | BINARY | MULTIVALUED | MULTIVALUED | MULTIVALUED COMPRESSION IS PERFORMED ON BINARY IMAGE |
| 3 | MULTIVALUED | BINARY | MULTIVALUED | MULTIVALUED COMPRESSION IS PERFORMED ON BINARY IMAGE |
| 4 | MULTIVALUED | MULTIVALUED | MULTIVALUED | |

FIG. 16

| BINARY COMPRESSION (MH/MR/MMR COMPRESSION) | MULTIVALUED IMAGE (JPEG COMPRESSION) | MULTIVALUED COMPRESSION RESULT OF BINARY IMAGE |
|---|---|---|
|  | 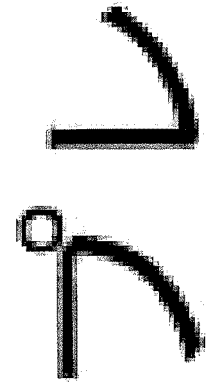 | 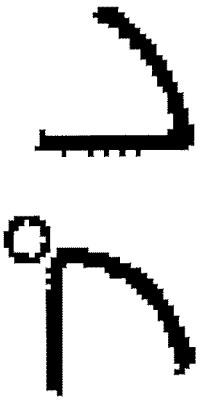 |

FIG. 22A    FIG. 22   FIG. 22A / FIG. 22B
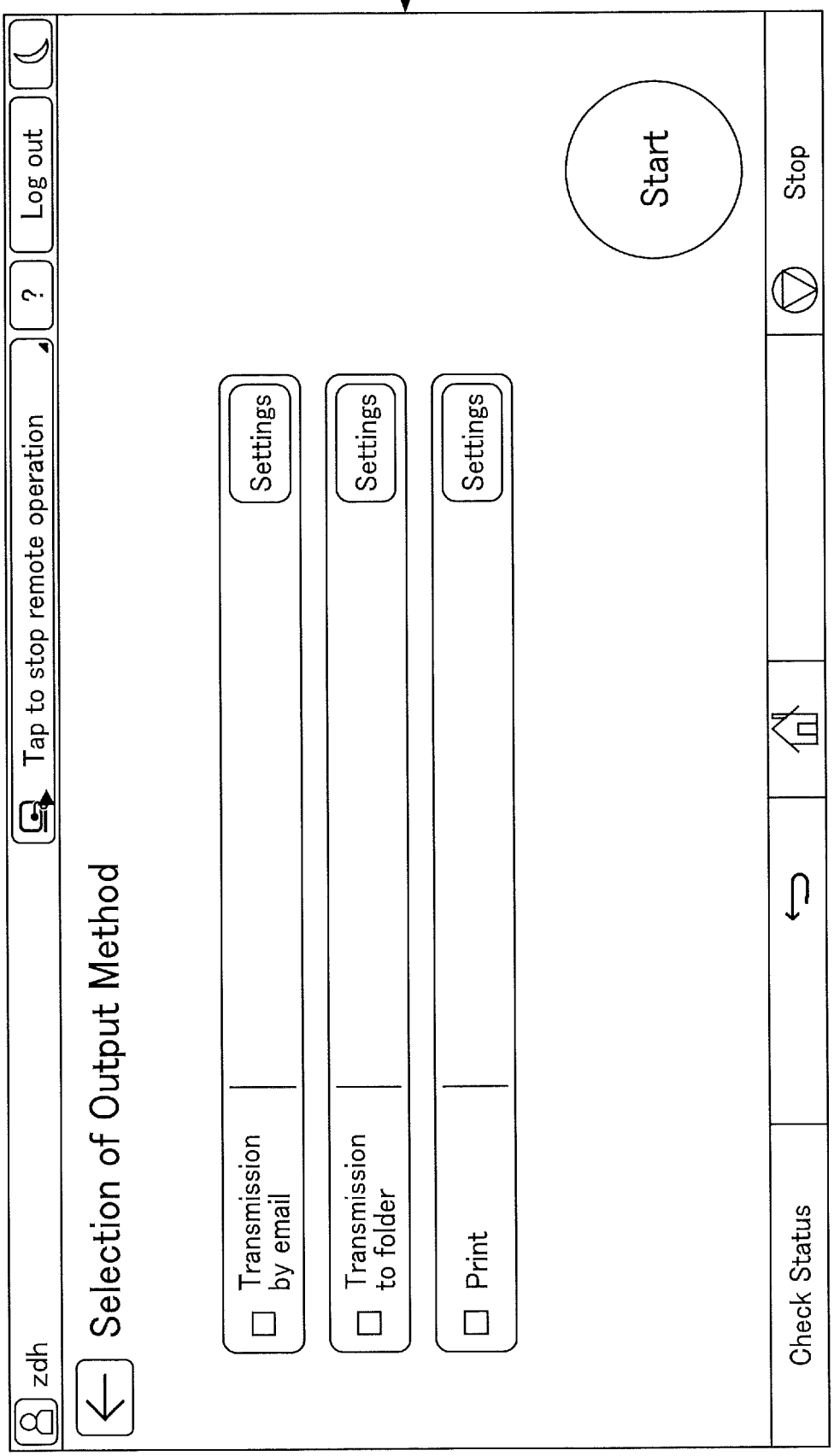

US 11,336,782 B2

IMAGE FORMING APPARATUS FOR CREATING IMAGE INCLUDING MULTIPLE DOCUMENT IMAGES, AND IMAGE FORMING METHOD, AND RECORDING MEDIUM THEREFORE

CROSS-REFERENCE TO RELATED APPLICATIONS

This patent application is based on and claims priority pursuant to 35 U.S.C. § 119(a) to Japanese Patent Application No. 2019-238330, filed on Dec. 27, 2019, in the Japan Patent Office, the entire disclosure of which is hereby incorporated by reference herein.

BACKGROUND

Technical Field

The present disclosure relates to an image forming apparatus, an image forming method, and a recording medium.

Description of the Related Art

In the related art, there are cases where a person (hereinafter, also referred to as an operator) responsible for services at a window such as a window at a bank or store receives a certificate document containing personal information such as a driver's license from a customer (hereinafter, also referred to as a client), combines the certificate document with an application document, and outputs the result.

An image of a yet-to-be-filled-in application document (hereinafter, also referred to as a mount image) and a location at which a certificate document is to be disposed are stored as a form. The stored form is loaded and an image of a certificate document scanned with a scanner function is disposed at the predetermined location in the mount image. In this manner, the resultant image can be output, for example, printed.

However, it is difficult with the technique of the related art to flexibly obtain a desired output result in accordance with a plurality of patterns of communication that occurs between the operator and the client. For example, in the cases where a printed application document with a watermark or the like is desired to be used as a sheet for printing or where a filled-in application document is received and scanned, an appropriate output result is not obtained. Specifically, when an image of a certificate document is disposed in the electronic mount image and the resulting image is printed on the sheet with a watermark or the like, the mount image is further printed on the sheet. Consequently, the application document based on the mount image is superimposed on the application document on the sheet by printing. It is also difficult to take a flexible action in accordance with a document submitted by the client such as replacing the mount image with a scanned image of a filled-in application document as occasion demands.

SUMMARY

Example embodiments include an image forming apparatus including circuitry to scan a first document, dispose an image of the scanned first document at a predetermined location in accordance with a form including an image of a second document and information on the predetermined location at which the image of the first document is to be disposed in the image of the second document, combine the disposed image of the first document and another image different from the image of the second document included in the form to generate an output image, and output the output image.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is a diagram for describing the pattern 1 and the pattern 2 according to an embodiment of the present disclosure;

FIG. 9 illustrates an example of a data structure of a form according to an embodiment of the present disclosure;

FIG. 13 is a diagram for describing the case where a form and an application document have different sizes according to an embodiment of the present disclosure;

FIG. 15 is a diagram for describing compression of an output image according to an embodiment of the present disclosure;

FIG. 16 is a diagram for describing differences in an output image depending on compression according to an embodiment of the present disclosure;

FIGS. 22A and 22B (FIG. 22) illustrate an example of an output method selection screen displayed after scanning according to an embodiment of the present disclosure.

Figure 1:
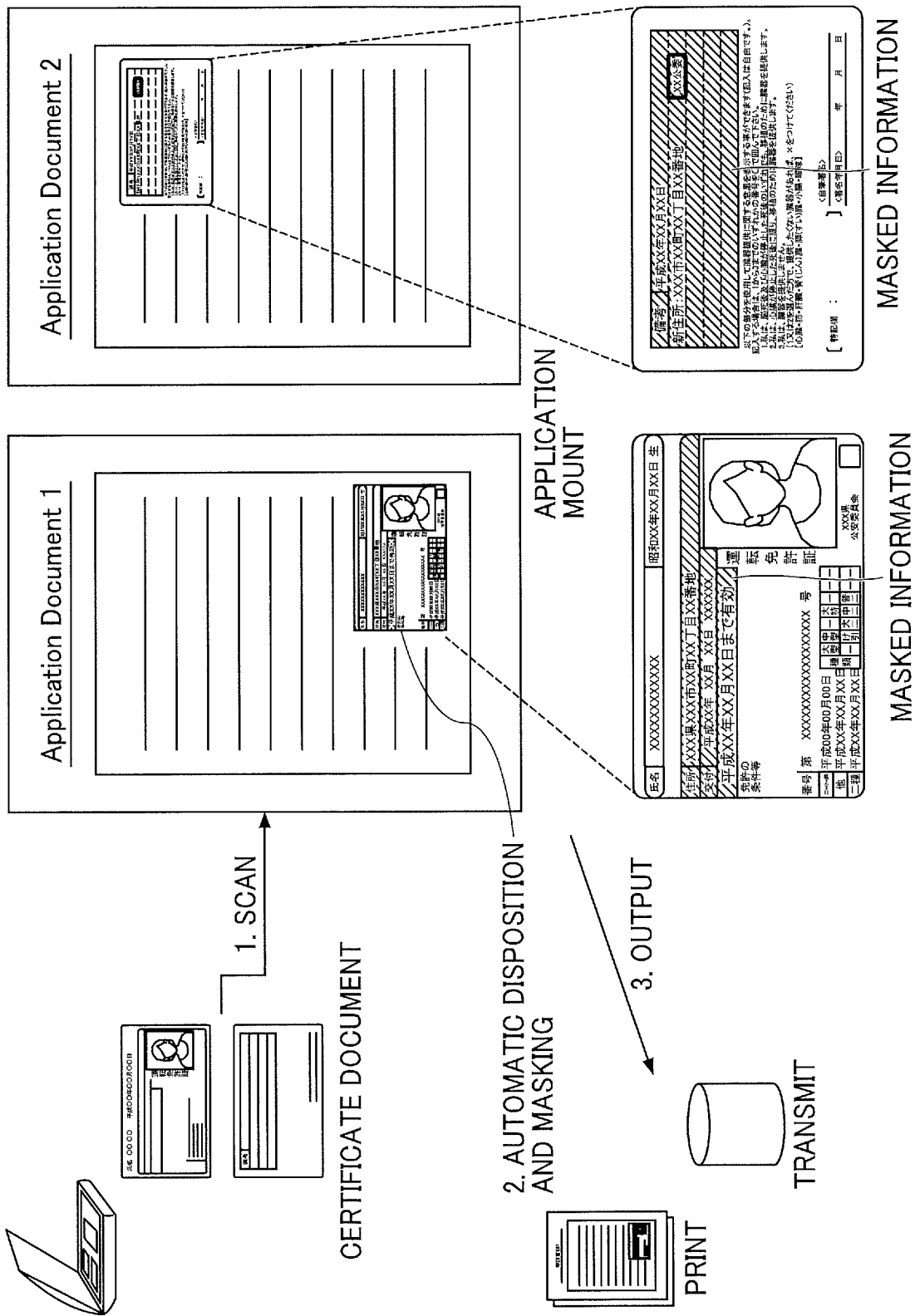
FIG. 1 is a diagram for describing the related art.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An "application document" and a "certificate document" will be described as an example of documents herein. However, the present disclosure is applicable to the case where an image of a document of any kind (also referred to as a first document) is disposed in an image of another document of any kind (also referred to as a second document). Note that the first document may be a single document or a plurality of documents. In addition, the first document may contain or not contain personal information. A "service manager" and an "operator" will be described as an example of persons who operate an image forming apparatus herein. However, the present disclosure is applicable to the case where any person operates the image forming apparatus. An application document with a watermark will be described as a pattern 1 herein. However, the present disclosure is applicable to the case where a document on which some kind of processing has been performed such as a special sheet having a measure for copy prohibition (such as a document with a watermark), a document with a seal, or a document on which a hologram is printed is used. A "filled-in application document" will be described as a pattern 2 herein. However, the present disclosure is applicable to the case where a document of any kind is scanned with a scanner function and a resultant image is used. A document used for "services at a window" will be described herein. However, the present disclosure is applicable to a document used for any purpose.

The term "mount image" refers to an image resulting from scanning of a yet-to-be-filled-in document with a scanner function. The term "scanned image" refers to an image resulting from scanning with a scanner function. The term "output image" refers to an image output from an image forming apparatus. For example, the output image may be a printed image, an image transmitted by email, or an image stored in a storage device.

A technique of the related art will be described first with reference to FIG. 1. As illustrated in FIG. 1, an operator scans a certificate document with a scanner function ("1. SCAN" in FIG. 1). Consequently, a scanned image of the certificate document is automatically disposed in a mount image (a scanned image of a yet-to-be-filled-in application document) ("2. AUTOMATIC DISPOSITION AND MASKING" in FIG. 1). Part of the certificate document may be masked. Then, an output image in which the scanned image of the certificate document is disposed in the mount image is output ("3. OUTPUT" in FIG. 1)

Three assumable patterns (a pattern 0, a pattern 1, and a pattern 2) of services at a window will be described next.

Pattern 0

Figure 2:
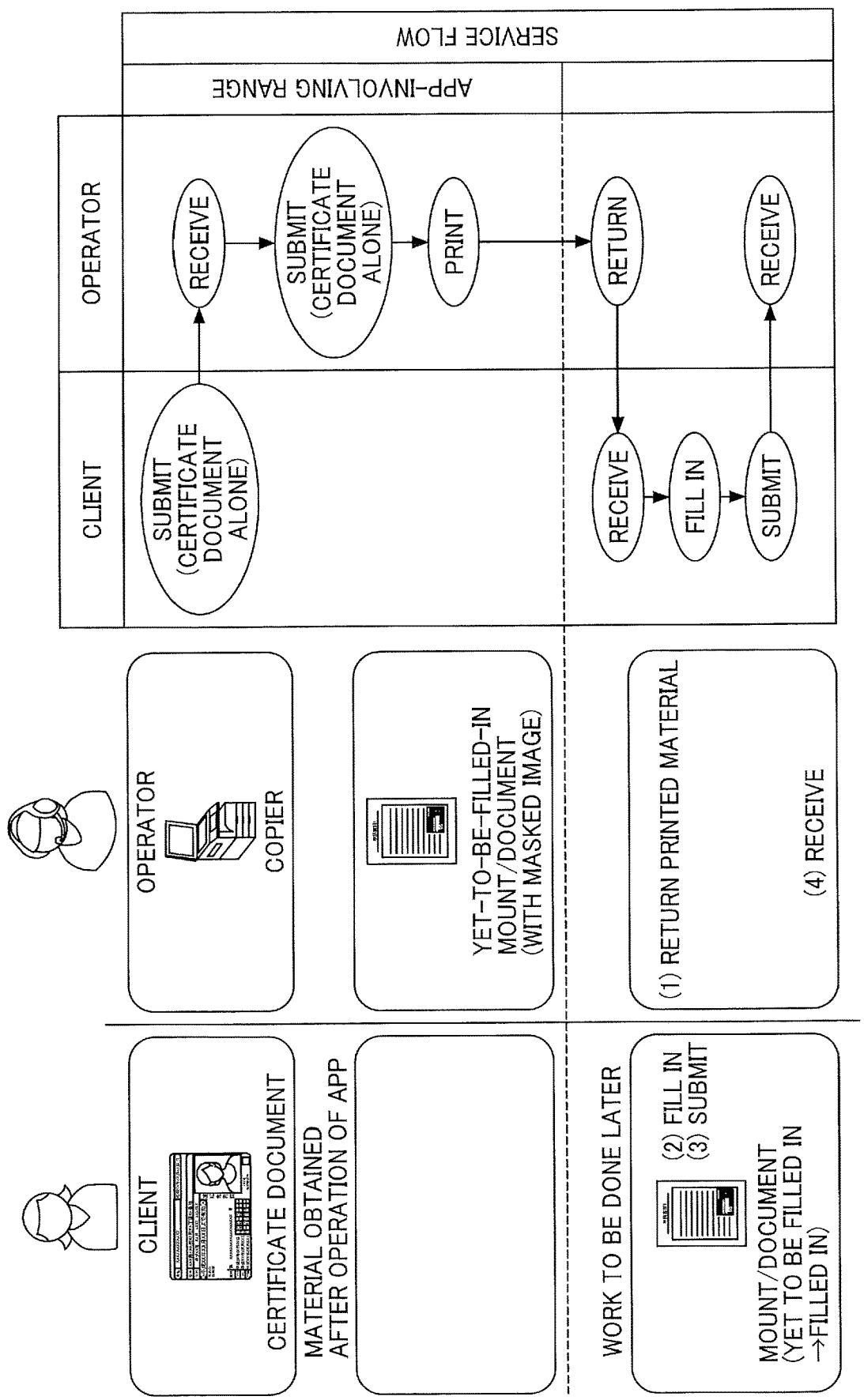
FIG. 2 is a diagram for describing a flow of a pattern 0 according to an embodiment of the present disclosure.

FIG. 2 is a diagram for describing a flow of the pattern 0 according to an embodiment of the present disclosure. Note that the pattern 0 is implemented with the technique of the related art described in FIG. 1. In the pattern 0, an operator receives a certificate document from a client and scans the certificate document with a scanner function. Consequently, an output image in which a scanned image of the certificate document is disposed in a mount image (a scanned image of a yet-to-be-filled-in application document) is printed on a blank sheet.

The operator returns the printed (yet-to-be-filled-in) application document to the client. The client fills in the application document and submits the application document to the operator.

Pattern 1

Figure 3:
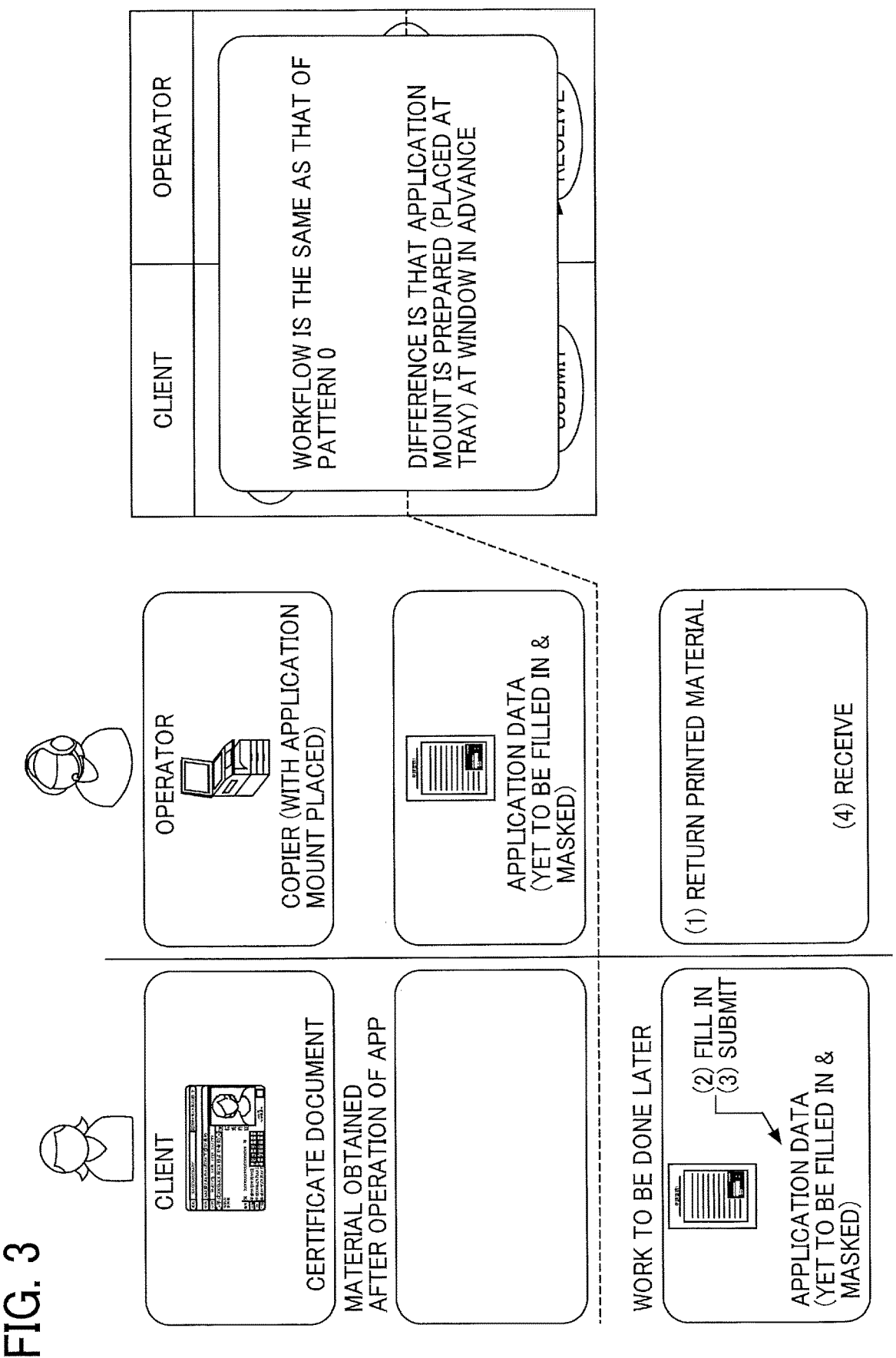
FIG. 3 is a diagram for describing a flow of a pattern 1 according to an embodiment of the present disclosure.

FIG. 3 is a diagram for describing a flow of the pattern 1 according to an embodiment of the present disclosure. In the pattern 1, an operator receives a certificate document from a client and scans the certificate document with a scanner function. The operator also places a (yet-to-be-filled-in) application document with a watermark or the like at a sheet feeding tray. Consequently, an output image in which a scanned image of the certificate document is disposed in an image based on blank sheet data (details will be described later) is printed on the (yet-to-be-filled-in) application document with a watermark or the like.

The operator returns the printed (yet-to-be-filled-in) application document to the client. The client fills in the application document and submits the application document to the operator.

Pattern 2

Figure 4:
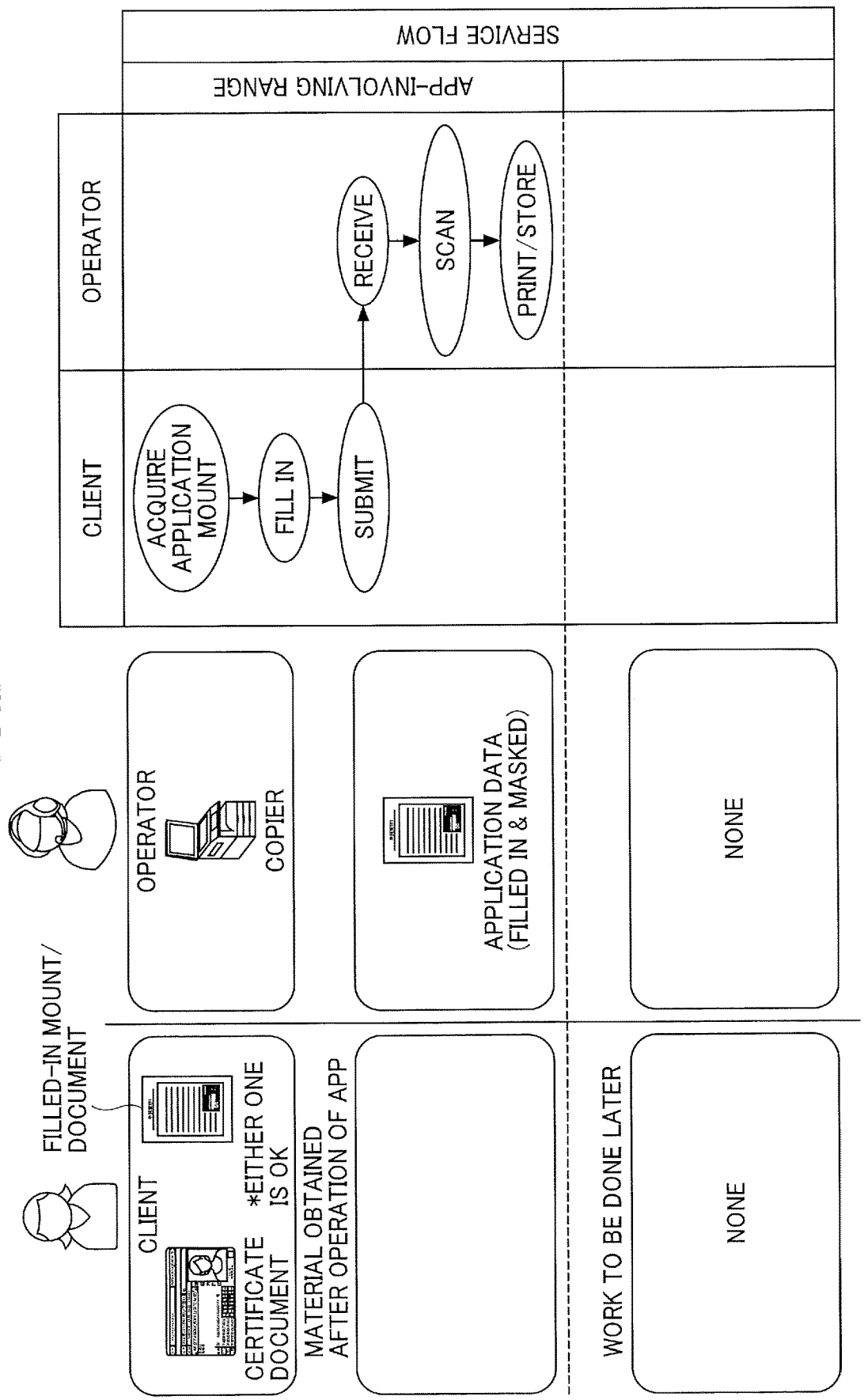
FIG. 4 is a diagram for describing a flow of a pattern 2 according to an embodiment of the present disclosure.

FIG. 4 is a diagram for describing a flow of the pattern 2 according to an embodiment of the present disclosure. In the pattern 2, an operator receives a certificate document and a filled-in application document from a client and scans the certificate document and the filled-in application document with a scanner function. Consequently, an output image in which a scanned image of the certificate document is disposed in a scanned image of the filled-in application document is printed on a blank sheet (for example, an ordinary blank sheet).

Thus, the operator can use the printed (filled-in) application document in the services without any further operation. That is, the operator no longer needs to perform further communication with the client.

Overall Configuration

Figure 5:
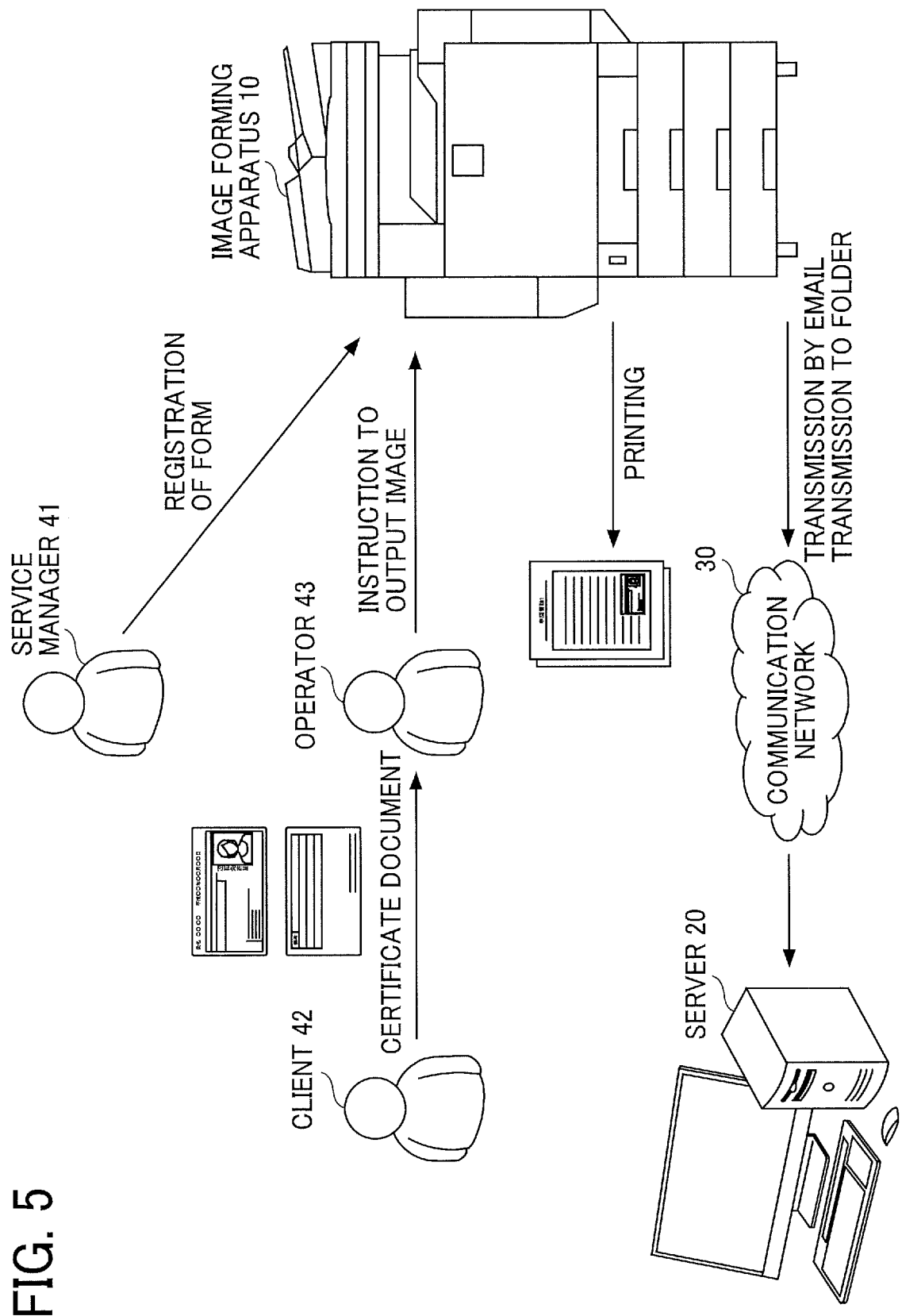
FIG. 5 is an overall configuration diagram according to an embodiment of the present disclosure.

FIG. 5 is an overall configuration diagram according to an embodiment of the present disclosure. As illustrated in FIG. 5, an image forming apparatus 10 is operated by a service manager 41 and an operator 43. The image forming apparatus 10 stores, as a form, a mount image (a scanned image of a yet-to-be-filled-in application document) and a predetermined location at which a certificate document is to be disposed. The image forming apparatus 10 loads the stored form and disposes an image of the certificate document scanned with the scanner function at the predetermined location. The image forming apparatus 10 also generates an output image corresponding to any of the pattern 0, the pattern 1, or the pattern 2 described above. The image forming apparatus 10 also performs output processes of printing the output image, transmitting the output image by email, and transmitting the output image to a folder, and so on. Each output process will be described below.

The image forming apparatus 10 is, for example, a multifunction peripheral/product/printer (hereinafter, also abbreviated as an MFP). In response to an operation performed by the service manager 41, the image forming apparatus 10 performs a process of registering a form. In response to an operation performed by the operator 43, the image forming apparatus 10 also performs a process of loading a form and outputting an output image. The image forming apparatus 10 will be described in detail below with reference to FIG. 8. Note that a storage in which a form is registered and from which a form is loaded may be a cloud storage of an external apparatus as well as a storage area of a main body or an operation unit of the image forming apparatus 10. The cloud storage may be a web service that is accessed and utilized directly by the image forming apparatus 10 or may be accessed via a tenant management website of another cloud service in which the image forming apparatus 10 is registered.

A server 20 is a computer that transmits an output image generated by the image forming apparatus 10 by email or stores the output image in a folder. The server 20 is connected to the image forming apparatus 10 via a communication network 30 to be able to communicate with the image forming apparatus 10. Specifically, the server 20 receives an output image generated by the image forming apparatus 10 from the image forming apparatus 10, and transmits the output image to a predetermined destination by email or stores the output image in a storage area such as a predetermined folder. For example, the server 20 may be a Simple Mail Transfer Protocol (SMTP) server (in the case of transmission by email) or a server including a storage device (in the case of transmission to a folder).

The service manager 41 operates the image forming apparatus 10 to cause the image forming apparatus 10 to perform the process of registering a form.

A client 42 visits a window with a certificate document with them and submits the certificate document to the operator 43 at the window.

The operator 43 receives the certificate document from the client 42 and operates the image forming apparatus 10 to cause the image forming apparatus 10 to perform the process of loading a form and outputting an output image.

Hardware Configuration

Figure 6:
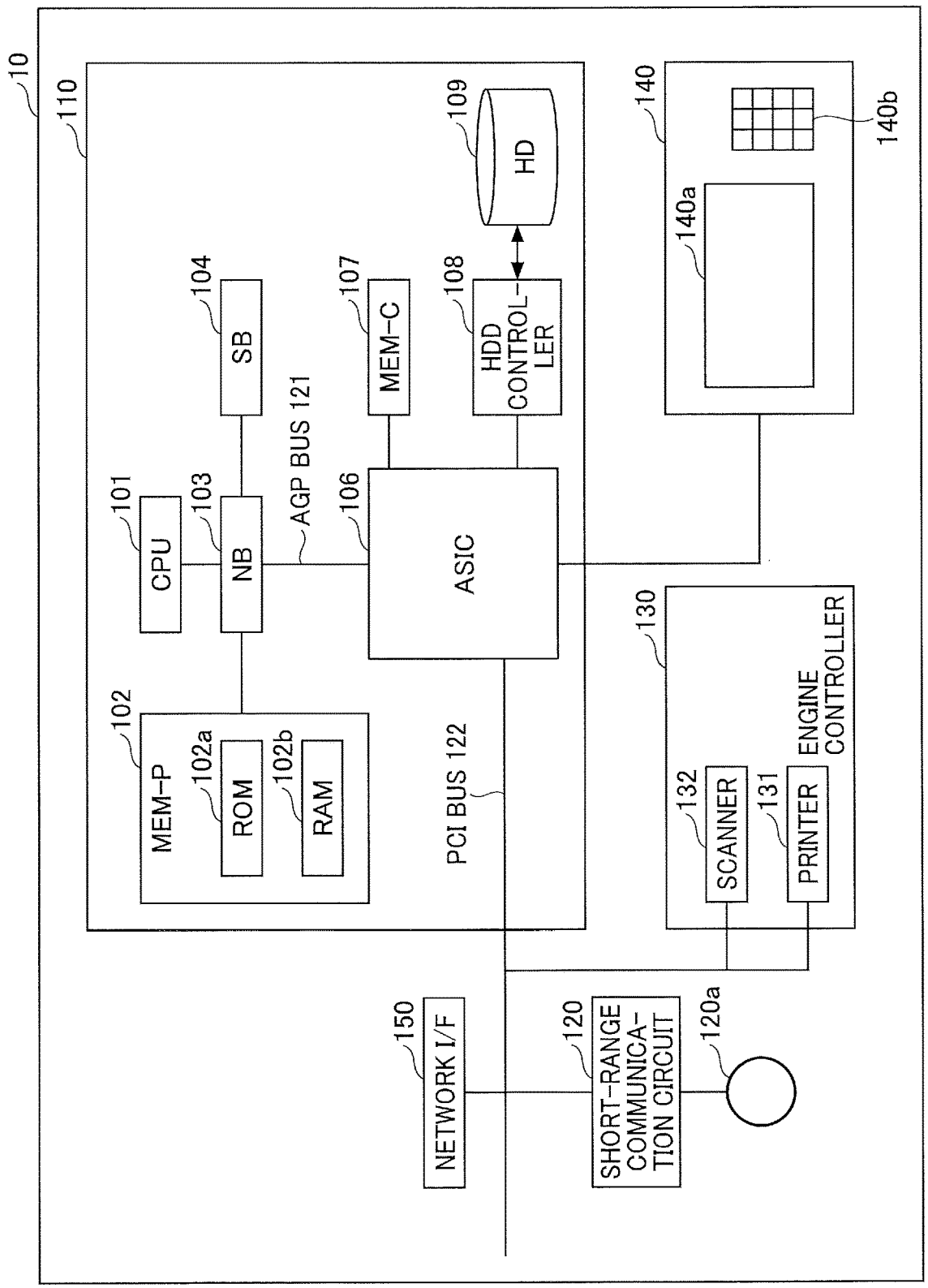
FIG. 6 is a hardware configuration diagram of an image forming apparatus according to an embodiment of the present disclosure.

FIG. 6 is a hardware configuration diagram of the image forming apparatus 10 according to an embodiment of the present disclosure. As illustrated in FIG. 6, the image forming apparatus 10 includes a controller 110, a short-range communication circuit 120, an engine controller 130, an operation panel 140, and a network interface (I/F) 150.

Among these, the controller 110 includes a central processing unit (CPU) 101 that is a main portion of a computer, a system memory (MEM-P) 102, a northbridge (NB) 103, a southbridge (SB) 104, an application-specific integrated circuit (ASIC) 106, a local memory (MEM-C) 107 that is a storage device, a hard disk drive (HDD) controller 108, and a hard disk (HD) 109 that is a storage device. The NB 103 and the ASIC 106 are coupled to each other by an Accelerated Graphics Port (AGP) bus 121.

Among these, the CPU 101 is a controller that controls the entire image forming apparatus 10. The NB 103 is a bridge that couples the CPU 101 to the MEM-P 102, the SB 104, and the AGP bus 121. The NB 103 includes a Peripheral Component Interconnect (PCI) master, an AGP target, and a memory controller that controls reading of data from or writing of data to the MEM-P 102.

The MEM-P 102 includes a read-only memory (ROM) 102a and a random access memory (RAM) 102b. The ROM 102a is a memory for storing a program and data that implement various functions of the controller 110. The RAM 102b is used as, for example, a memory for loading the program and the data and as a rendering memory at the time of memory printing. The program deployed in the RAM 102b from, for example, the ROM 102a, may be stored on a computer-readable recording medium, such as a compact disc-read only memory (CD-ROM), a compact disc-recordable (CD-R), or a digital versatile disc (DVD), as a file of an installable or executable format and may be provided.

The SB 104 is a bridge that couples the NB 103 to a PCI device and a peripheral device. The ASIC 106 is an image-processing-application-specific integrated circuit (IC) including hardware components for image processing. The ASIC 106 has a role of a bridge that couples the AGP bus 121, a PCI bus 122, the HDD controller 108, and the MEM-C 107 to one another. The ASIC 106 includes a PCI target, an AGP master, an arbiter (ARB) serving as a central processor of the ASIC 106, a memory controller that controls the MEM-C 107, a plurality of direct memory access controllers (DMACs) that perform rotation or the like of image data with a hardware logic or the like, and a PCI unit that transfers data to a scanner 131 and a printer 132 via the PCI bus 122. A Universal Serial Bus (USB) interface or an Institute of Electrical and Electronics Engineers 1394 (IEEE1394) interface may be coupled to the ASIC 106.

The MEM-C 107 is a local memory used as an image buffer for copying and as a code buffer. The HD 109 is a storage that stores image data, font data used in printing, and forms. The HDD controller 108 controls reading of data from or writing of data to the HD 109 under the control of the CPU 101. The AGP bus 121 is a bus interface for a graphics accelerator card that is devised for accelerating processing of graphics. The AGP bus 121 enables direct and high-throughput access to the MEM-P 102 to be able to accelerate the graphics accelerator card.

The short-range communication circuit 120 is coupled to an antenna 120a. The short-range communication circuit 120 is a communication circuit that is compliant with near-field communication (NFC), Bluetooth (registered trademark), or the like.

The engine controller 130 includes the scanner 131 and the printer 132. The operation panel 140 includes a panel display 140a and an operation input section 140b, which may be together implemented by a touch panel. The panel display 140a displays a screen of current setting values, a selection screen, and so on and accepts input from an operator. The operation input section 140b includes, for example, numeral buttons that accept setting values of image forming conditions such as color density setting conditions and a start button that accepts a copy start instruction. The controller 110 controls of the entire image forming apparatus 10. For example, the controller 110 controls rendering, communication, and inputs on the operation panel 140. The scanner 131 or the printer 132 includes a component for image processing such as error diffusion and gamma conversion.

An application switching button of the operation panel 140 allows the operator to sequentially switch between a document box function, a copy function, a printer function, and a facsimile function of the image forming apparatus 10 to select one of the functions. When the document box function is selected, the image forming apparatus 10 enters a document box mode. When the copy function is selected, the image forming apparatus 10 enters a copy mode. When the printer function is selected, the image forming apparatus 10 enters a printer mode. When the facsimile function is selected, the image forming apparatus 10 enters a facsimile mode.

The network I/F 150 is an interface that enables communication of data via the communication network 30. The short-range communication circuit 120 and the network I/F 150 are electrically coupled to the ASIC 106 through the PCI bus 122.

Prior to description of each function of the image forming apparatus 10, the overview of the pattern 1 and the pattern 2 mentioned above will now be described.

FIG. 7 is a diagram for describing the pattern 1 and the pattern 2 according to an embodiment of the present disclosure. The pattern 1 is illustrated in the middle in FIG. 7, and the pattern 2 is illustrated on the right side in FIG. 7.

Pattern 1

1. A scanned image of a yet-to-be-filled-in application document (mount image) is stored as a form. Note that an application document of the pattern 1 has a watermark or the like.

2. A certificate document is scanned with a scanner function.

3-1. The service manager 41 is able to determine a location at which a scanned image of the certificate document is to be disposed while seeing a preview of a state in which the scanned image of the certificate document is disposed in the mount image on the screen of the image forming apparatus 10 and register the resultant image as a form.

3-2. The operator 43 is able to see a preview of the state in which the scanned image of the certificate document is disposed in the mount image on the screen of the image forming apparatus 10 and instruct the image forming apparatus 10 to output an output image.

4. A yet-to-be-filled-in application document is used as a printing sheet. Note that an application document of the pattern 1 has a watermark or the like.

5. The output image is an image in which an image based on blank sheet data and the scanned image of the certificate document are combined. The output image of the pattern 1 is an image in which the scanned image of the certificate document is disposed at the predetermined location in accordance with the form and the image based on the blank sheet data and the scanned image of the certificate document are combined (note that the output image may include information on a region to be masked). That is, the image based on the blank sheet data is used instead of the mount image stored as the form.

6. The output image obtained in 5. is printed on the printing sheet aforementioned in 4. As a result, a (yet-to-be-filled-in) application document (with a watermark or the like) in which the certificate document is disposed completes.

The blank sheet data will now be described. The blank sheet data is data that replaces, at the time of outputting, the mount image (that is, the scanned image of the yet-to-be-filled-in application document) stored as a form in the pattern 1. Specifically, the blank sheet data is data of a blank space having the same size as the mount image.

As described above, in the pattern 1, in response to receipt of a certificate document from the client 42, the operator 43 is able to print the output image on a sheet prepared in advance such as a sheet with a watermark or the like.

Pattern 2

1. A scanned image of a yet-to-be-filled-in application document (mount image) is stored as a form.

2. A certificate document and a filled-in application document are scanned with a scanner function.

3-1. The service manager 41 is able to determine a location at which a scanned image of the certificate document is to be disposed while seeing a preview of a state in which the scanned image of the certificate document is disposed in the mount image on the screen of the image forming apparatus 10 and to register the resultant image as a form.

3-2. The operator 43 is able to see a preview of the state in which the scanned image of the certificate document is disposed in the scanned image of the filled-in application document on the screen of the image forming apparatus 10 and instruct the image forming apparatus 10 to output an output image.

4. A blank sheet is used as a printing sheet.

5. The output image is an image in which the scanned image of the filled-in application document and the scanned image of the certificate document are combined. The output image of the pattern 2 is an image in which the scanned image of the certificate document is disposed at a predetermined location in accordance with the form and the scanned image of the filled-in application document and the scanned image of the certificate document are combined (note that the output image may include information on a region to be masked). That is, the scanned image of the filled-in application document is used instead of the mount image stored as the form.

6. The output image obtained in 5. is printed on the printing sheet aforementioned in 4. As a result, a (filled-in) application document in which the certificate document is disposed completes.

As described above, in the pattern 2, the operator 43 just needs to receive a certificate document and a filled-in application document from the client 42 to be able to obtain the filled-in application document in which the certificate document of the client 42 is disposed. Therefore, communication between the operator 43 and the client 42 is performed just once at the window.

Functional Blocks

Figure 8:
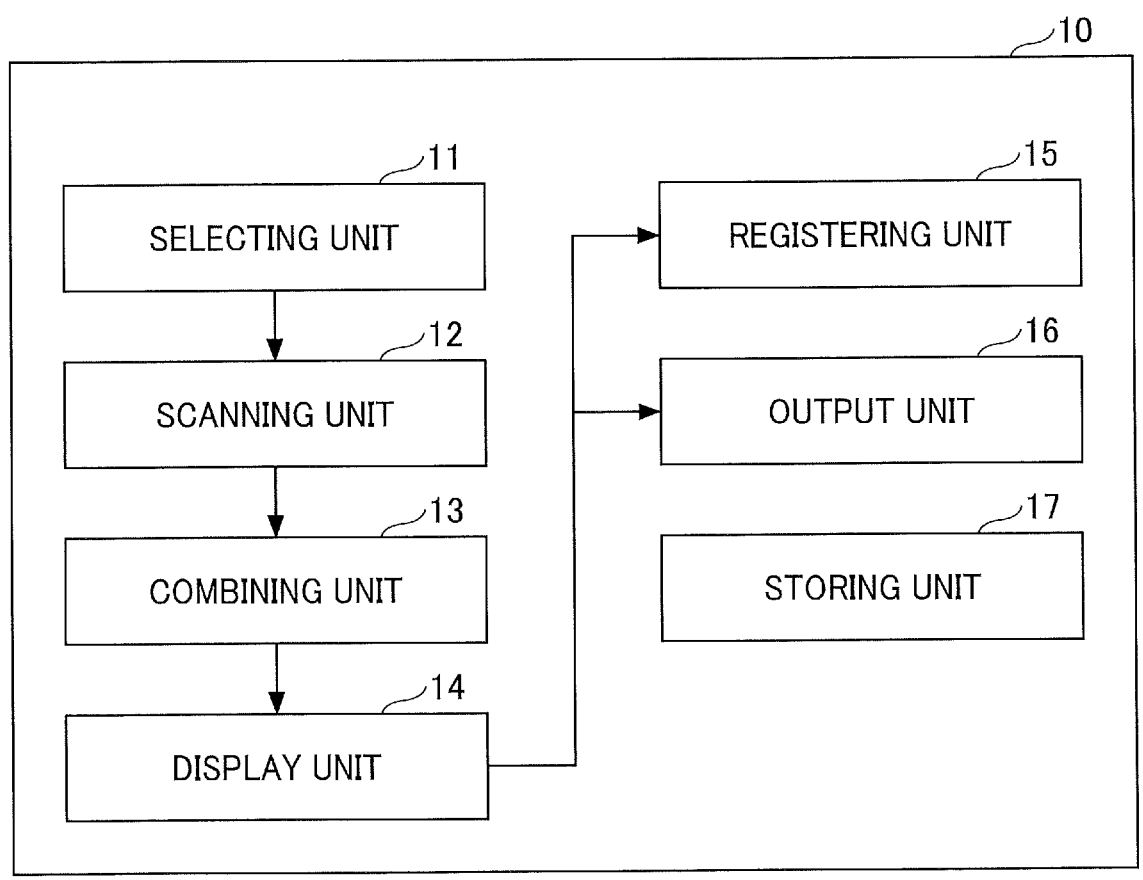
FIG. 8 is a functional block diagram of the image forming apparatus according to an embodiment of the present disclosure.

FIG. 8 is a functional block diagram of the image forming apparatus 10 according to an embodiment of the present disclosure. The image forming apparatus 10 can include a selecting unit 11, a scanning unit 12, a combining unit 13, a display unit 14, a registering unit 15, an output unit 16, and a storing unit 17. The image forming apparatus 10 executes a program to be able to function as the selecting unit 11, the scanning unit 12, the combining unit 13, the display unit 14, the registering unit 15, and the output unit 16. A process of registering a form and a process of loading a form will be separately described below.

Registering Form

The selecting unit 11 displays a screen that allows the service manager 41 to select a workflow. The service manager 41 selects a workflow in the screen. For example, the service manager 41 selects any of the pattern 0, the pattern 1, or the pattern 2 in the screen. The selecting unit 11 stores one or more patterns of the selected workflow as one or more forms. That is, information indicating which pattern each form corresponds to is stored.

The scanning unit 12 causes a document to be scanned in response to an instruction from the service manager 41. As described also in FIG. 10, the scanning unit 12 instructs an application program interface (API) 1021 of an MFP main body 1020 to call a scanner function and perform a process of scanning a document.

The combining unit 13 generates an image of a preview screen. Specifically, the combining unit 13 disposes a display image of the certificate document at a predetermined location in a display image of a yet-to-be-filled-in application document and displays the resultant image. The combining unit 13 disposes the display image of the certificate document at the location instructed by the service manager 41. The combining unit 13 also masks a region instructed by the service manager 41.

The display unit 14 displays the preview screen. Specifically, the display unit 14 displays a screen in which the scanned image of the certificate document is disposed in the scanned image of the yet-to-be-filled-in application document. The display unit 14 also reflects an instruction from the service manager 41 in the preview screen.

The registering unit 15 stores data of the form in the storing unit 17 in response to an instruction from the service manager 41. That is, a form including images of one or more yet-to-be-filled-in application documents and information on one or more locations at which images of one or more certificate documents are to be disposed in the images of the one or more yet-to-be-filled-in application documents is stored. Specifically, data of the form described with reference to FIG. 9 is stored.

Note that data of the form may be stored in the image forming apparatus 10 or in a cloud server or the like.

Loading Form

The selecting unit 11 accepts selection of a form from the operator 43. The selecting unit 11 determines which of the pattern 0, the pattern 1, and the pattern 2 the selected form corresponds to with reference to the data of the selected form, and causes the scanning unit 12, the combining unit 13, the display unit 14, and the output unit 16 to perform a process corresponding to the determined pattern.

The scanning unit 12 causes a document to be scanned in response to an instruction from the operator 43. As described also in FIG. 11, the scanning unit 12 instructs the API 1021 of the MFP main body 1020 to call the scanner function and perform a process of scanning a document.

The combining unit 13 generates an image of a preview screen and an output image.

The display unit 14 displays the preview screen. Specifically, in the case of the pattern 0, the display unit 14 displays a screen in which the scanned image of the certificate document is disposed at the predetermined location in the mount image (that is, the scanned image of the yet-to-be-filled-in application document stored as a form). In the case of the pattern 1, the display unit 14 displays a screen in which the scanned image of the certificate document is disposed at the predetermined location in the mount image (that is, the scanned image of the yet-to-be-filled-in application document stored as a form). In the case of the pattern 2, the display unit 14 displays a screen in which the scanned image of the certificate document is disposed at the predetermined location in the image of the filled-in application document scanned with a scanner function (that is, the scanned image of the filled-in application document).

In response to an instruction from the operator 43, the output unit 16 performs an output process, such as printing the output image, transmitting the output image by email, or transmitting the output image to a folder. In the case of the pattern 0, the output image is an image in which the scanned image of the certificate document is disposed at the predetermined location in the mount image (that is, the scanned image of the yet-to-be-filled-in application document) (note that the output image may include information on a masked region). In the case of the pattern 1, the output image is an image in which the scanned image of the certificate document is disposed at the predetermined location in accordance with the form and an image based on the blank sheet data and the scanned image of the certificate document are combined (note that the output image may include information on a masked region). That is, the image based on the blank sheet data is used instead of the mount image stored as the form. In the case of the pattern 2, the output image is an image in which the scanned image of the certificate document is disposed at the predetermined location in accordance with the form and the scanned image of the filled-in application document and the scanned image of the certificate document are combined (note that the output image may include information on a masked region). That is, the scanned image of the filled-in application document is used instead of the mount image stored as the form.

In the pattern 1, the filled-in application document may be scanned with a scanner function, and the resultant image may be stored as the output image.

Note that a folder to which the output image is transmitted may be in a cloud server or the like, or may be in the image forming apparatus 10.

The storing unit 17 stores information on a form. The data structure of the form will be described in detail below with reference to FIG. 9.

Each of the functions described in the embodiments above may be implemented by one or a plurality of pieces of processing circuitry. Here, the term "processing circuitry" used herein refers to a processor that is programmed to carry out each function by software such as a processor implemented by an electronic circuit, or a device such as an ASIC, digital signal processor (DSP), or field programmable gate array (FPGA) that is designed to carry out each function described above or an existing circuit module.

Data Structure

FIG. 9 illustrates an example of a data structure of a form according to an embodiment of the present disclosure. As illustrated in FIG. 9, information for identifying a form (for example, a form name), information regarding an application document (a scanned image of a yet-to-be-filled-in application document), information regarding a certificate document (for example, a name, a size, a to-be-disposed location, scan settings of each certificate document), information regarding masking (for example, a color (such as black or white), a width, a height, and a location of each region to be masked), and a workflow (for example, any of the pattern 0, the pattern 1, or the pattern 2) are stored as a form.

Processing Method

The process of registering a form and the process of loading a form will be described below with reference to FIGS. 10 and 11, respectively. The image forming apparatus 10 includes the MFP main body 1020 and an operation device used for operating the MFP. The operation device includes applications 1010 such as an application 1011 (which is a program that is an embodiment of the present disclosure). Note that a terminal such as a smartphone or a tablet may include the application 1011. That is, a terminal such as a smartphone or a tablet may serve as the operation device.

Registering Form

Figure 10:
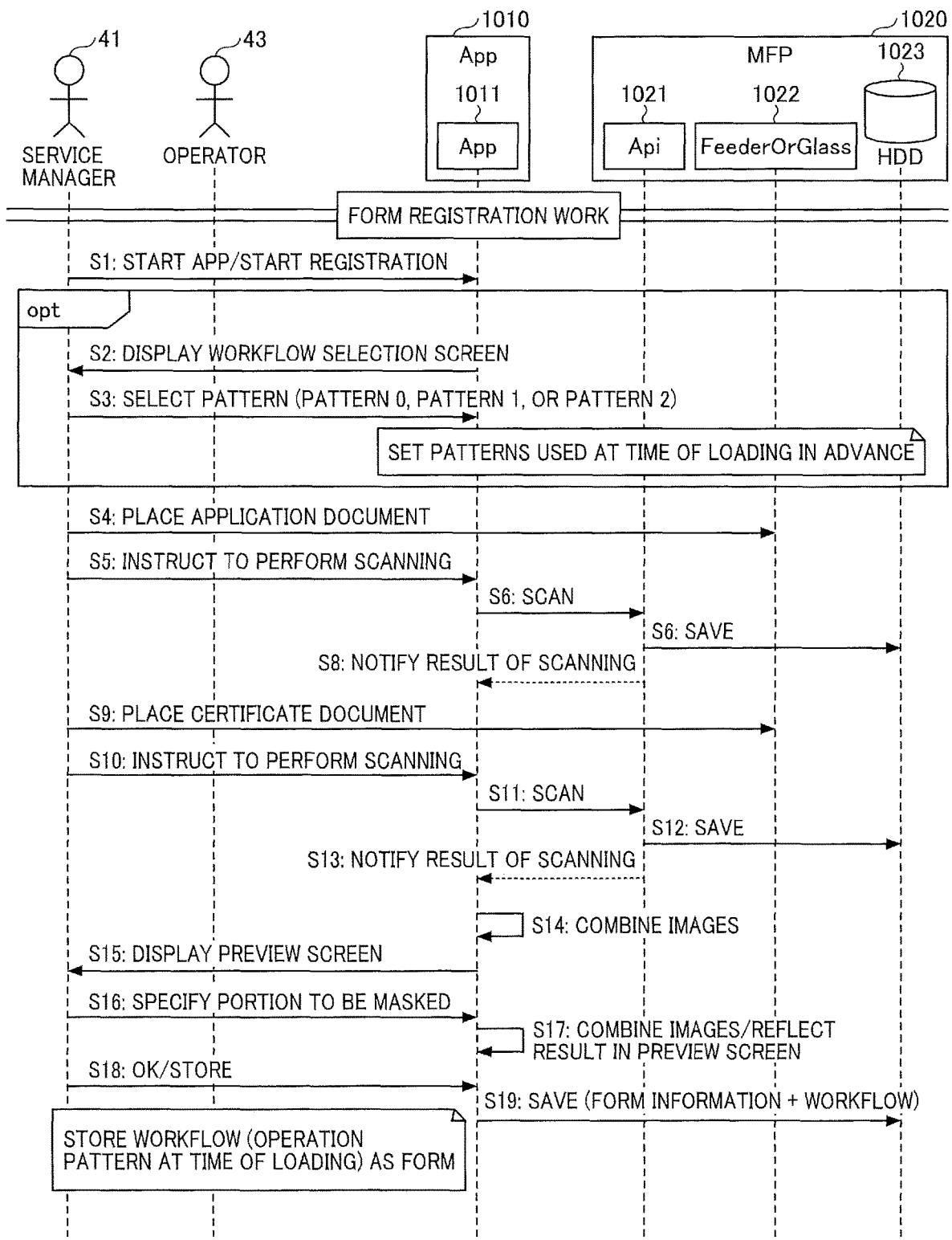
FIG. 10 is a sequence diagram of registration of a form according to an embodiment of the present disclosure.

FIG. 10 is a sequence diagram of registration of a form according to an embodiment of the present disclosure.

In step 1 (S1), the service manager 41 instructs the application 1011 to start up and start registering of a form.

In step 2 (S2), in response to the instruction given in S1, the application 1011 (the selecting unit 11 described above) displays a screen that allows the service manager 41 to select a workflow.

In step 3 (S3), the service manager 41 selects a workflow in the screen displayed in S2. For example, the service manager 41 selects any of the pattern 0, the pattern 1, or the pattern 2 in the screen displayed in S2. Consequently, the application 1011 stores a pattern of the selected workflow.

In step 4 (S4), the service manager 41 places a yet-to-be-filled-in application document at an automatic document feeder or document platen glass 1022 of the MFP main body 1020.

In step 5 (S5), the service manager 41 instructs the application 1011 to scan the application document.

In step 6 (S6), in response to the instruction given in S5, the application 1011 (the scanning unit 12 described above) instructs the API 1021 of the MFP main body 1020 to call the scanner function and perform the process of scanning a document.

In step 7 (S7), a scanned image of the application document scanned with the scanner function is stored in an HDD 1023 (that is, the storing unit 17) of the MFP main body 1020.

In step 8 (S8), the API 1021 notifies the application 1011 of a result of the scanning.

In step 9 (S9), the service manager 41 places a certificate document (for example, a certificate document of the service manager 41) at the automatic document feeder or document platen glass 1022 of the MFP main body 1020.

In step 10 (S10), the service manager 41 instructs the application 1011 to scan the certificate document.

In step 11 (S11), in response to the instruction given in S10, the application 1011 instructs the API 1021 of the MFP main body 1020 to call the scanner function and perform the process of scanning a document.

In step 12 (S12), a scanned image of the certificate document scanned with the scanner function is stored in the HDD 1023 of the MFP main body 1020.

In step 13 (S13), the API 1021 notifies the application 1011 of a result of the scanning.

In step 14 (S14), in response to an instruction from the service manager 41, the application 1011 (the combining unit 13 described above) superimposes the scanned image of the certificate document scanned in S11 on the mount image (that is, the scanned image of the yet-to-be-filled-in application document scanned in S6).

In step 15 (S15), the application 1011 (the display unit 14 described above) displays the preview screen. Specifically, the application 1011 displays a screen in which the scanned image of the certificate document is superimposed on the mount image (that is, the scanned image of the yet-to-be-filled-in application document).

In step 16 (S16), the service manager 41 gives the application 1011 an instruction about a location at which the scanned image of the certificate document is to be disposed in the mount image (that is, the scanned image of the yet-to-be-filled-in application document). The service manager 41 may also give the application 1011 an instruction about a region to be masked.

In step 17 (S17), the application 1011 disposes the scanned image of the certificate document at the location indicated by the instruction given in S16. The application 1011 also masks the region indicated by the instruction given in S16. The application 1011 then reflects the instructions given in S16 in the preview screen.

In step 18 (S18), the service manager 41 instructs the application 1011 to register the form (that is, store the form in the HDD 1023).

In step 19 (S19), in response to the instruction given in S18, the application 1011 (the registering unit 15 described above) stores data of the form in the HDD 1023. Specifically, data of the form such as the data described with reference to FIG. 9 is stored.

Loading Form

Figure 11:
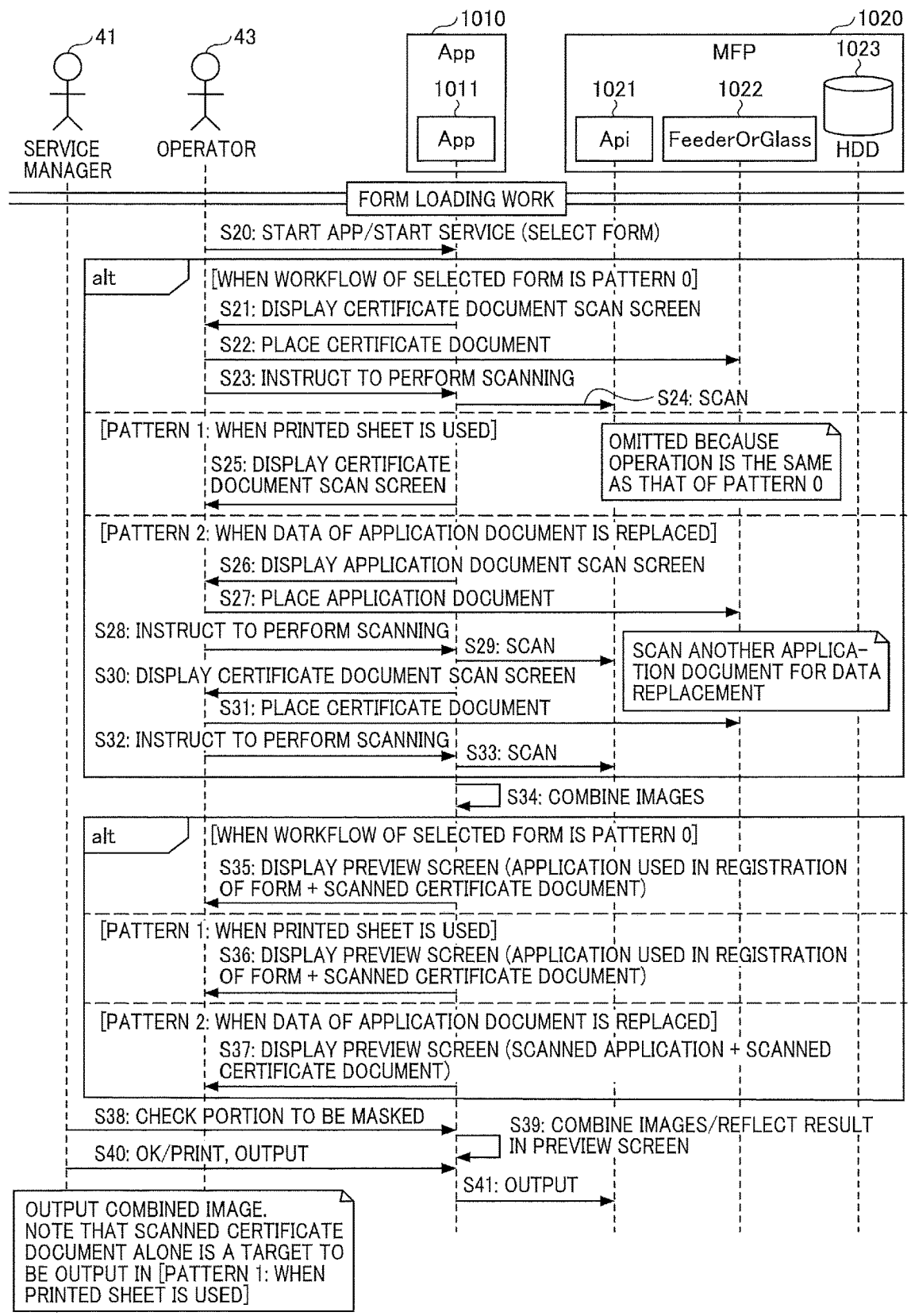
FIG. 11 is a sequence diagram of loading of a form according to an embodiment of the present disclosure.

FIG. 11 is a sequence diagram of loading of a form according to an embodiment of the present disclosure.

In step 20 (S20), the operator 43 instructs the application 1011 to start up and start a service. The operator 43 then selects a form. If the selected form corresponds to the pattern 0, the process proceeds to step 21. If the selected form corresponds to the pattern 1, the process proceeds to step 25. If the selected form corresponds to the pattern 2, the process proceeds to step 26.

Pattern 0

In step 21 (S21), the application 1011 displays a certificate document scan screen.

In step 22 (S22), the operator 43 places a certificate document (a certificate document of the client 42) at the automatic document feeder or document platen glass 1022 of the MFP main body 1020.

In step 23 (S23), the operator 43 instructs the application 1011 to scan the certificate document.

In step 24 (S24), in response to the instruction given in S23, the application 1011 (the scanning unit 12 described above) instructs the API 1021 of the MFP main body 1020 to call the scanner function and perform the process of scanning a document.

Pattern 1

In step 25 (S25), the certificate document scan screen is displayed. Since the following processing is substantially the same as the processing of S22 to S24 of the pattern 0, description thereof is omitted.

Pattern 2

In step 26 (S26), the application 1011 displays an application document scan screen. In step 27 (S27), the operator 43 places an application document (an application document that has been filled in by the client 42) at the automatic document feeder or document platen glass 1022 of the MFP main body 1020.

In step 28 (S28), the operator 43 instructs the application 1011 to scan the application document.

In step 29 (S29), in response to the instruction given in S28, the application 1011 instructs the API 1021 of the MFP main body 1020 to call the scanner function and perform the process of scanning a document.

In step 30 (S30), the application 1011 displays the certificate document scan screen. In step 31 (S31), the operator 43 places a certificate document (a certificate document of the client 42) at the automatic document feeder or document platen glass 1022 of the MFP main body 1020.

In step 32 (S32), the operator 43 instructs the application 1011 to scan the certificate document.

In step 33 (S33), in response to the instruction given in S32, the application 1011 instructs the API 1021 of the MFP main body 1020 to call the scanner function and perform the process of scanning a document.

In step 34 (S34), the application 1011 (the combining unit 13 described above) disposes an image of the certificate document scanned with the scanner function at a predetermined location in accordance with the form stored in the HDD 1023. The process then proceeds to step 35 in the case of the pattern 0. The process proceeds to step 36 in the case of the pattern 1. The process proceeds to step 37 in the case of the pattern 2.

Pattern 0

In step 35 (S35), the application 1011 (the display unit 14 described above) displays a preview screen. Specifically, the application 1011 displays a screen in which the scanned image of the certificate document is disposed at the predetermined location in the mount image (that is, the scanned image of the yet-to-be-filled-in application document stored as the form).

Pattern 1

In step 36 (S36), the application 1011 displays a preview screen. Specifically, the application 1011 displays a screen in which the scanned image of the certificate document is disposed at the predetermined location in the mount image (that is, the scanned image of the yet-to-be-filled-in application document stored as the form).

Pattern 2

In step 37 (S37), the application 1011 displays a preview screen. Specifically, the application 1011 displays a screen in which the scanned image of the certificate document is disposed at the predetermined location in an image of the filled-in application document scanned with the scanner function (that is, the scanned image of the filled-in application document).

In step 38 (S38), the operator 43 checks whether a region to be masked is appropriate. The operator 43 instructs the application 1011 to move the region to be masked as occasion demands.

In step 39 (S39), the application 1011 masks the region indicated by the instruction given in S38. The application 1011 then reflects the instruction given in S38 in the preview screen.

In step 40 (S40), the operator 43 instructs the application 1011 to output an output image. The operator 43 can select an output method. In the case of the pattern 0, the output image is an image in which the scanned image of the certificate document is disposed at the predetermined location in the mount image (that is, the scanned image of the yet-to-be-filled-in application document) (note that the output image may include information on the masked region). In the case of the pattern 1, the output image is an image in which the scanned image of the certificate document is disposed at the predetermined location in accordance with the form and an image based on the blank sheet data and the scanned image of the certificate document are combined (note that the output image may include information on the masked region). That is, the image based on the blank sheet data is used instead of the mount image stored as the form. In the case of the pattern 2, the output image is an image in which the scanned image of the certificate document is disposed at the predetermined location in accordance with the form and the scanned image of the filled-in application document and the scanned image of the certificate document are combined (note that the output image may include information on the masked region). That is, the scanned image of the filled-in application document is used instead of the mount image stored as the form.

In step 41 (S41), in response to the instruction given in S40, the application 1011 instructs the API 1021 of the MFP main body 1020 to call an output function and perform an output process such as printing the output image, transmitting the output image by email, or transmitting the output image to a folder.

The image forming apparatus according to at least one embodiment of the present disclosure is capable of disposing a document in various other documents and outputting a resultant image.

OTHER EMBODIMENTS

Note that the image forming apparatus 10 may have each of functions described below alone or may have the functions described below in combination. Description will be given below with reference to FIGS. 12 to 16.

How Certificate Document is Displayed when Form is Edited

Figure 12:
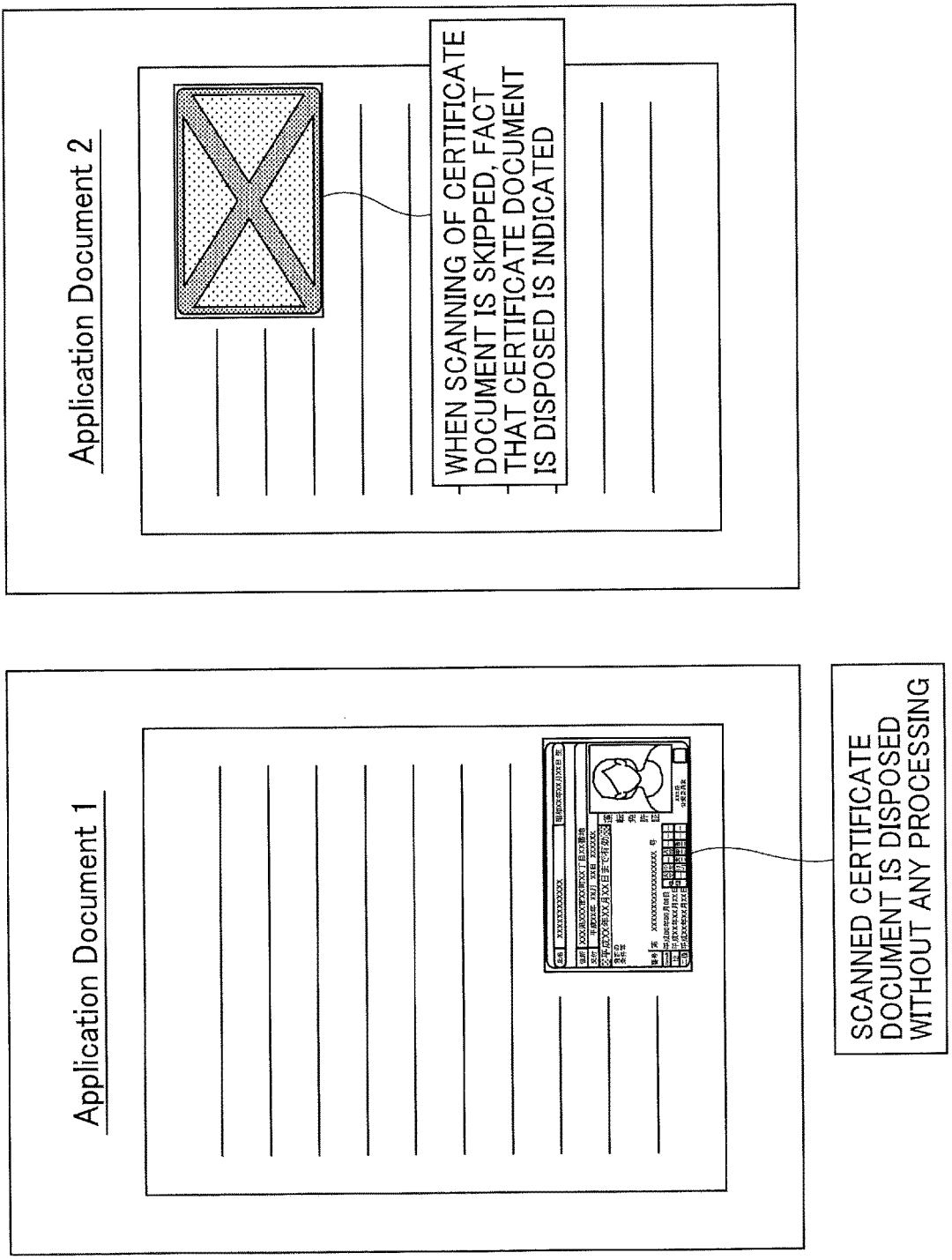
FIG. 12 is a diagram for describing how a certificate document is displayed when a form is edited according to an embodiment of the present disclosure.

FIG. 12 is a diagram for describing how a certificate document is displayed when a form is edited according to an embodiment of the present disclosure.

The service manager 41 expectedly uses a certificate document such as a driver's license of the service manager 41 as a sample when registering a form. However, it is not preferable that an image of the certificate document such as the driver's license of the service manager 41 is stored in a form. On the other hand, when the service manager 41 modifies (edits) the registered form, the service manager 41 is desirably notified that the certificate document is disposed in the registered form. In one solution, when scanning of a certificate document is skipped, it is just indicated that the certificate document is disposed as illustrated on the right side in FIG. 12.

In Case where Form and Application Document have Different Sizes

FIG. 13 is a diagram for describing the case where a form and an application document have different sizes according to an embodiment of the present disclosure.

When an application document is scanned in the case of the pattern 2, the scanned image of the application document and the mount image registered as the form may expectedly have different sizes. For example, if the size of the scanned image of the application document is smaller than the size of the form, the output unit 16 can correct the output image as illustrated at a lower middle portion of FIG. 13 instead of determining that such a state is an error. If the size of the scanned image of the application document is larger than the size of the form, the output unit 16 can correct the output image as illustrated at a lower right portion of FIG. 13 instead of determining that such a state is an error.

Registering Size of Certificate Document

Figure 14:
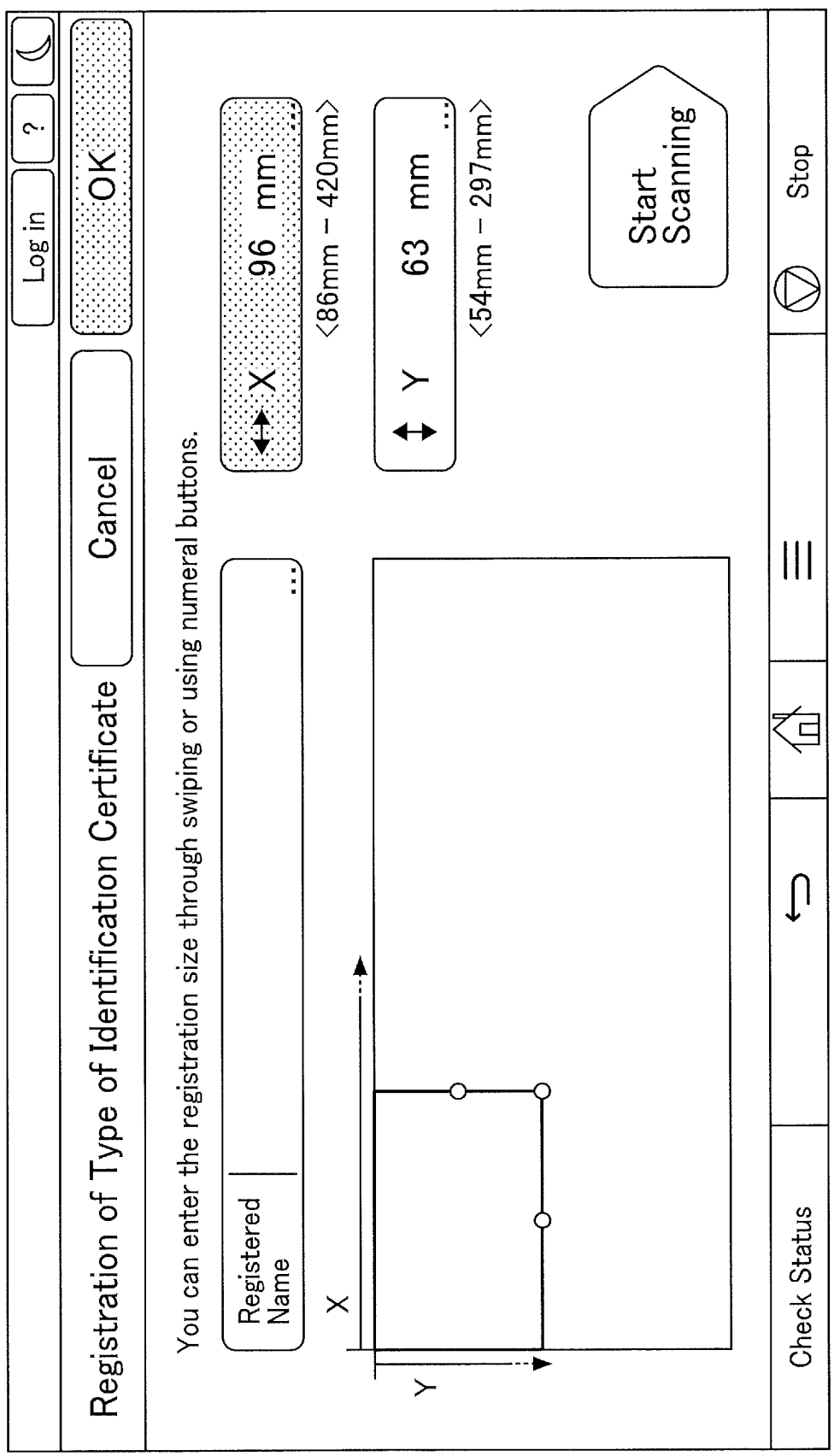
FIG. 14 is a diagram for describing registration of the size of a certificate document according to an embodiment of the present disclosure.

FIG. 14 is a diagram for describing registration of the size of a certificate document according to an embodiment of the present disclosure. The certificate document may be an identification card, a driver's license, or a passport and thus expectedly has a size that is determined to some extent by each country but is indefinite. If a configuration that allows for registration of the size of the certificate document in advance is provided, the indefinite size no longer needs to be specified each time the certificate document is scanned. In addition, if a configuration for presenting a preview for specifying the size from an actually scanned image is provided, the configuration makes the registration work easier. For example, a preview is displayed in a white frame (having a size determined by X and Y) illustrated in FIG. 14, and the size can be specified through swiping.

Compressing Output Image

FIG. 15 is a diagram for describing compression of an output image according to an embodiment of the present disclosure. When combining a scanned image of an application document and a scanned image of a certificate document, the image forming apparatus 10 is capable of determining a combining (compression) method used for the output image in accordance with the compression schemes used for the respective images.

Specifically, if the application document is represented by binary data (monochrome (compression scheme: Modified Huffman (MH)/Modified Read (MR)/Modified Modified Read (MMR)) and the certificate document is presented by binary data, the compression method used for the output image is binary compression. If the application document is represented by binary data and the certificate document is represented by multivalued data (color/grayscale (compression scheme: Joint Photographic Experts Group (JPEG)), the compression method used for the output image is multivalued compression. If the application document is represented by multivalued data and the certificate document is represented by binary data, the compression method used for the output image is multivalued compression. If the application document is represented by multivalued data and the certificate document is represented by multivalued data, the compression method used for the output image is multivalued compression.

FIG. 16 is a diagram for describing differences in an output image depending on compression according to an embodiment of the present disclosure. An example of a binary image (which is suitable for processing of text or the like because blurring at an edge portion is unlikely and which may involve defective dots) is illustrated on the left side in FIG. 16. An example of a multivalued image (which is suitable for an image having a blurring (moire) edge portion and which has a larger data size than the binary image) is illustrated in the middle in FIG. 16. An example of a result of multivalued compression of the binary image is illustrated on the right side in FIG. 16. In this manner, deterioration in the image quality that occurs at combination of the images is successfully reduced.

Enabling/Disabling Output Method

For example, the service manager 41 can make settings for disabling/enabling individual output methods in the image forming apparatus 10. Thus, transmission of the output image to an external apparatus and storage of the output image in media are successfully limited (taking out of, for example, personal information is successfully suppressed).

Verifying Privilege

Privileges (such as a privilege for scanning and a privilege of printing) of a user (for example, the operator 43) who has logged in is verified. In this way, scanning and printing are performed properly within the privilege. In response to an error relating to the printing privilege (when the user who has a privilege for monochrome printing attempts to perform color printing), the privilege is changed so that the user is permitted to perform color printing. In this way, the user who has a privilege for monochrome printing no longer needs to log in again or to execute the job again.

Correcting Setting Values

There may be cases where, when a form is loaded, the operation according to settings of the loaded form can no longer be carried out because the device configurations and settings of the image forming apparatus 10 or the like have been changed from the configurations and settings set at the time of registration of the form. In such cases, the setting values of the form are corrected. For example, suppose that a peripheral device (such as a finisher) is attached to the image forming apparatus 10 at the time of registration of a form but the peripheral device is removed at the time of loading of the form. In such a case, an error may be avoided and the functions can be used within a range of currently available settings.

Inputting/Outputting Form

An image forming apparatus is capable of receiving data of a form stored in another image forming apparatus or a cloud server. In addition, an image forming apparatus is capable of transmitting data of a form stored therein to another image forming apparatus or a cloud server. Therefore, information on the form set by the image forming apparatus can be reflected in the other image forming apparatus, or the registered form may be backed up.

Output as Layered Structure

Instead of compressing the scanned image of the application document and the scanned image of the certificate document in the manner as illustrated in FIG. 15, the output image may be generated to have a layered structure. When the output image is output (is transmitted by email or transmitted to a folder) as electronic data, it is desirable that information contained in a masked portion is not to be extracted from the output image. Thus, the images are desirably combined as integrated data. However, at the time of printing, it is sufficient to mask a portion printed to have the layered structure. When the output image is output to have the layered structure, the output image can be printed without degradation in the image quality caused by combination of the images (compression format).

User Interface

Screens displayed in the image forming apparatus 10 will be described below with reference to FIGS. 17 to 22.

Figure 17A:
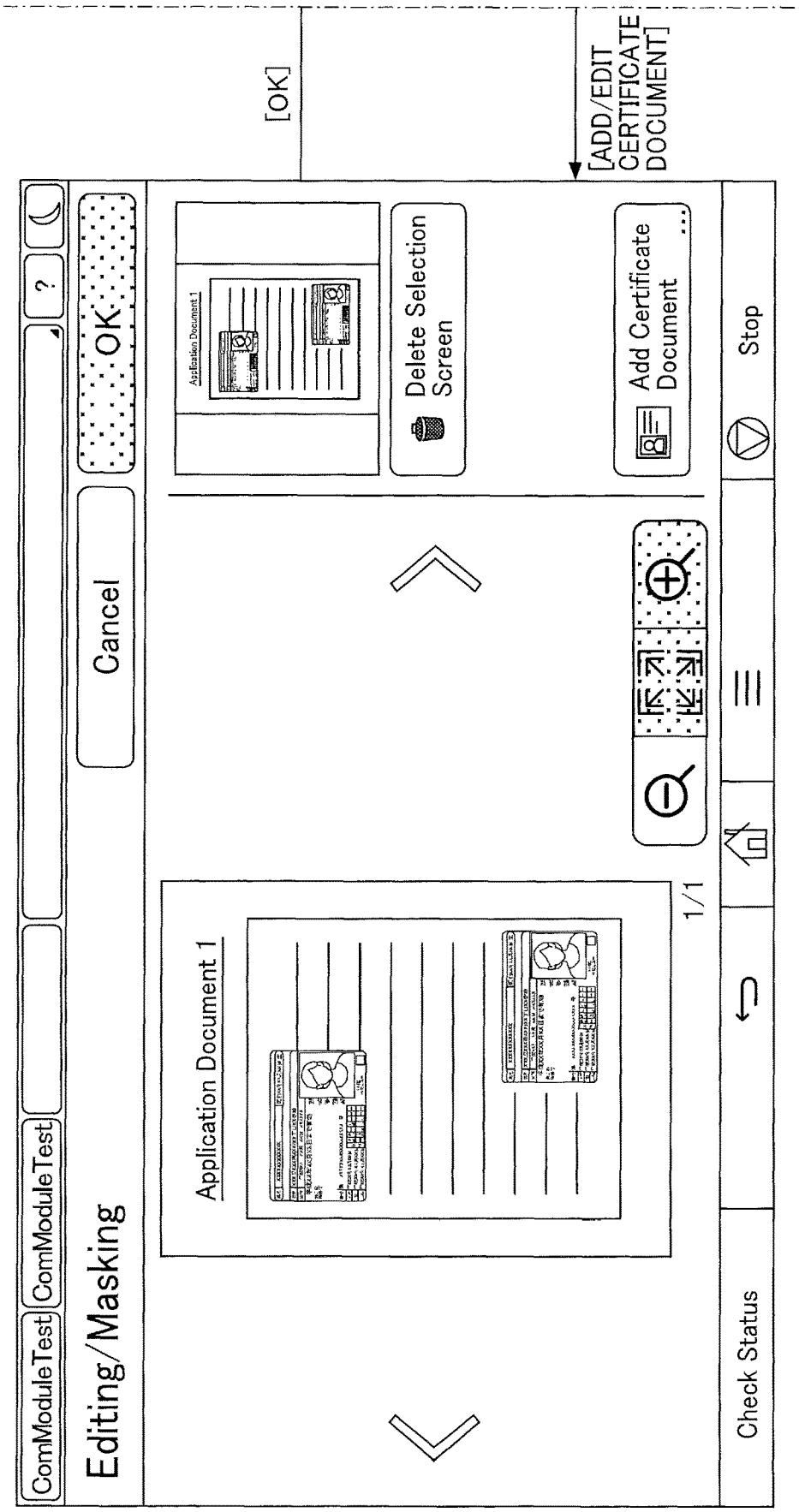
FIGS. 17A and 17B (FIG. 17) illustrate an example of a form registration screen according to an embodiment of the present disclosure.
Figure 17B:
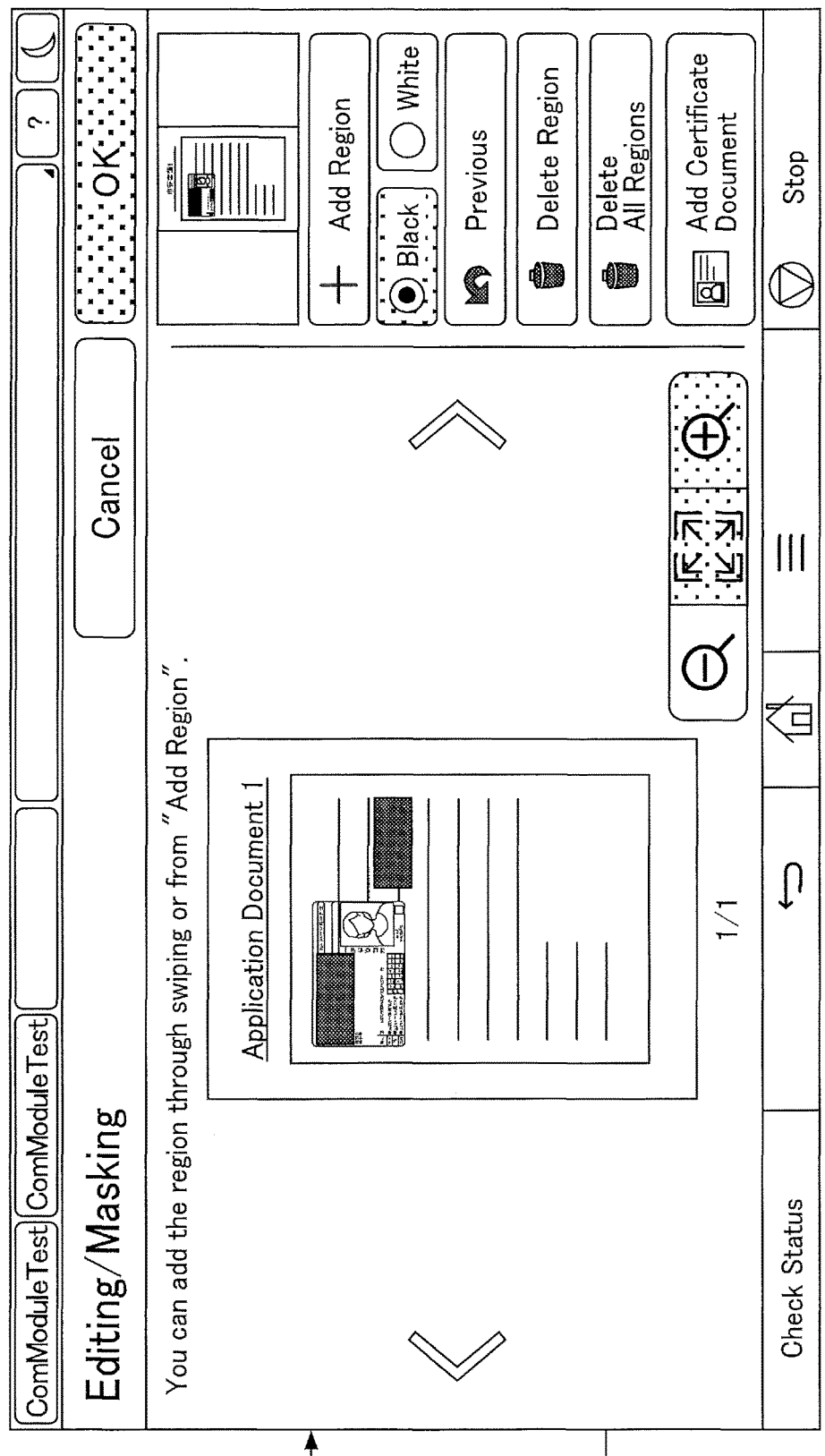

FIG. 17 illustrates an example of a form registration screen (preview screen) according to an embodiment of the present disclosure. In response to scanning an application document and a certificate document (that is, S6 to S8 and S11 to S13 of FIG. 10), the image forming apparatus 10 disposes a display image of the certificate document at a predetermined location in a display image of the application document for display to allow for checking on a preview screen (that is, S14 of FIG. 10). In S15 of FIG. 10, the image forming apparatus 10 displays a screen illustrated in FIG. 17.

A screen on the left side in FIG. 17 is a screen for adding and disposing a certificate document in an application document or deleting a certificate document from an application document. A screen on the right side in FIG. 17 is a screen for adding masking and specifying a region to be masked or for deleting masking.

The screen on the left side in FIG. 17 is a document editing screen displayed when a form is registered for each workflow. In the document editing screen, the operator can scan one or more application documents and can edit and determine locations at which one or more certificate documents are to be disposed in a scanned image of each application document. Note that an application document serving a mount may be scanned in this screen or in another screen (the previous screen). A small preview screen is displayed in the upper right portion of the screen. In the small preview screen, the entire image including the page of the application document displayed on the left side and the certificate document being edited is displayed, so that the operator can grasp the entire page if a portion is displayed in an enlarged manner. With an "Add Certificate Document" button, the location at which the certificate document is to be disposed in the application document (coordinates in the X axis (downward direction) and the Y axis (lateral direction) represented by pixels with respect to the origin that is the upper left corner of the image of the application document)

is set, the type of the certificate document is selected, and the size of the certificate document (the numbers of pixels in the downward and lateral directions from the coordinates of the location) is specified. In response to the certificate document being scanned, the scanned image is disposed at the coordinates to have the size in the image of the application document. Note that the arrangement, size, and type of the certificate document alone may be set and registered in association with a form, without scanning a real certificate document. With a "Delete Selection Screen" button, the selected certificate document and application document (on a page-by-page basis) can be deleted. With an "OK" button, the settings of the application document and the certificate document can be set, and the screen can be changed to a masking editing screen. Note that the number times a guidance screen (illustrated in FIG. 20) is displayed when the operator 43 actually scans the documents using the workflow (form) changes depending on the number of registered certificate documents and the number of registered application documents, and the scan guidance screen is repeatedly displayed until scanning is performed as many times as the number of registered documents. With a "Cancel" button, the settings of all the application documents and certificate documents and the scanned content can be cancelled and deleted. With a "Previous" button, the state is returned to the state before one document is scanned or set. With a rightwards arrow and a leftwards arrow, the application document can be changed to an application document (or the page of the application document) to which a certificate document is to be added when there are a plurality of certificate documents (or a plurality of application document pages).

The screen on the right side in FIG. 17 is a masking editing screen displayed when a form is registered for each workflow. With an "Add Region" button, the image of the application document and the image of the certificate document can be masked. For example, personal information or the like may be masked in black or white. In response to the "OK" button being pressed, editing of the document on the left side in FIG. 17 and editing of masking on the right side in FIG. 17 complete, and the form can be registered as a new workflow. Note that the registered masking is loaded as the form and can be edited in a screen illustrated in FIG. 21 before being output. With a "Cancel" button, all the masking can be cancelled, and the displayed screen can be returned to the screen displayed immediately after the change. With a "Previous" button, the state is returned to the state before one masking is edited. With a rightwards arrow and a leftwards arrow, the application document can be changed to an application document (or the page of the application document) for which the form is to be edited and masking can be added when there are a plurality of application documents (a plurality of application document pages).

Figure 18:
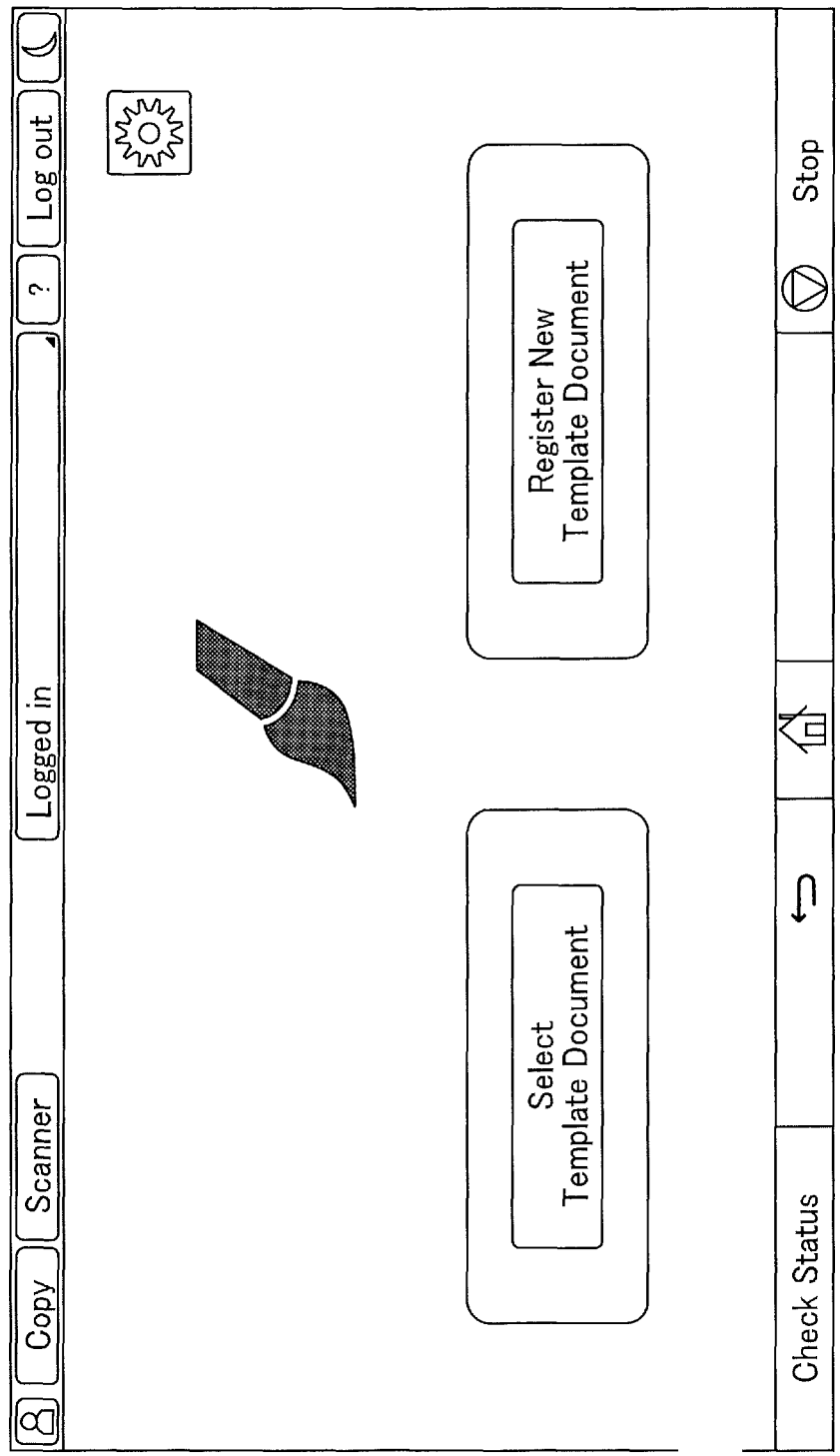
FIG. 18 illustrates an example of a screen displayed after an application is started according to an embodiment of the present disclosure.

FIG. 18 illustrates an example of a screen displayed after the start of an application according to an embodiment of the present disclosure (a program according to an embodiment of the present disclosure). The screen illustrated in FIG. 18 is a screen displayed after the start of the application in response to tapping of an icon of the application in a home screen displayed on the operation unit of the image forming apparatus 10. A "Select Template Document" button is a button for displaying a registered form selection screen (in response to pressing the button, the screen changes to a screen illustrated in FIG. 19). A "Register New Template Document" button is a button for registering a new form. In response to pressing this button, the screen changes to the screen illustrated in FIG. 17 (to the state in which the preview illustrated in FIG. 17 is not displayed since no document has been scanned).

Figure 19:
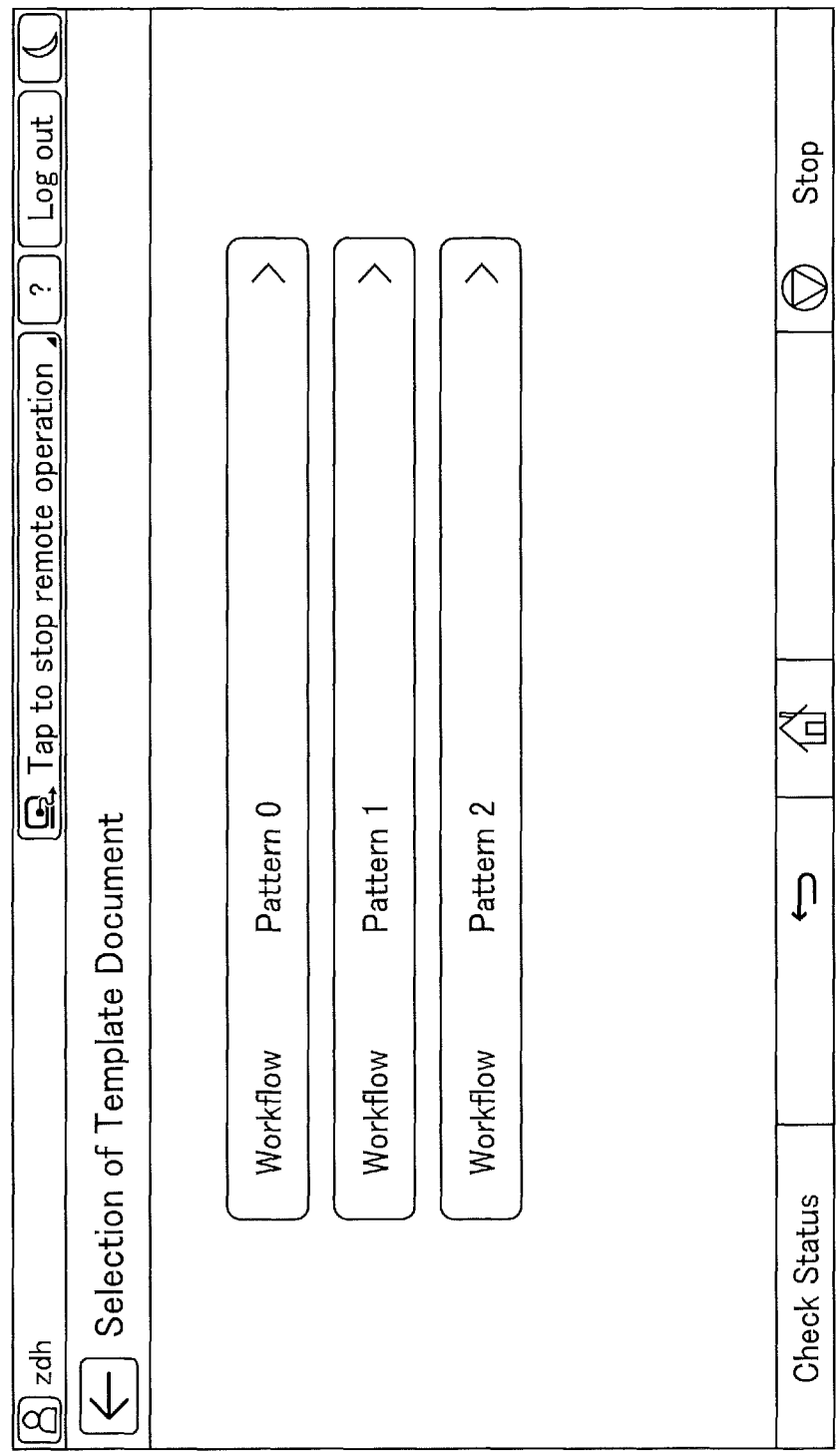
FIG. 19 illustrates an example of a form loading screen according to an embodiment of the present disclosure.

FIG. 19 illustrates an example of a form loading (form selection) screen according to an embodiment of the present disclosure. The image forming apparatus 10 displays the screen illustrated in FIG. 19 in response to the "Select Template Document" button illustrated in FIG. 18 being pressed. When the application software starts in S20 of FIG. 11, the image forming apparatus 10 may display the screen illustrated in FIG. 18 in which a new form can be registered, for example, when a user who has logged in has a role of an administrator (such as an information technology administrator at a store) and may display the screen illustrated in FIG. 19 when the user who has logged in is a general user (such as the operator 43). FIG. 19 illustrates a screen that allows the operator 43 to select a desired form from among the registered forms.

Note that the screen illustrated in FIG. 19 may also be a screen for selecting and loading a form registered as a workflow. A form associated with identification information (such as the pattern 0, 1, 2, . . . ) of the selected workflow can be loaded. The screen illustrated in FIG. 20 changes for each loaded form.

Figure 20:
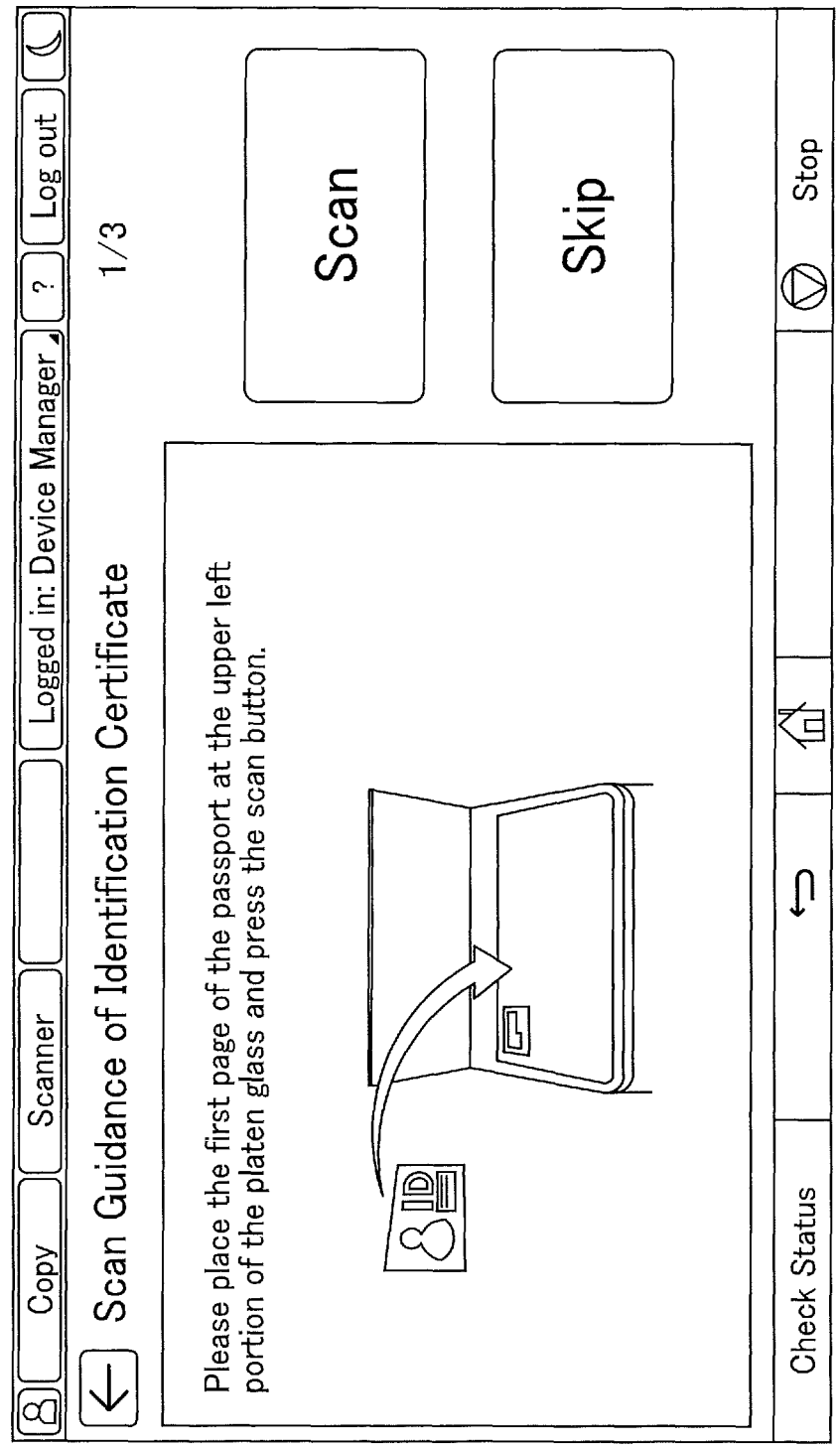
FIG. 20 illustrates an example of a document scan guidance screen displayed after loading of the form according to an embodiment of the present disclosure.

FIG. 20 illustrates an example of a document scan guidance screen displayed after the form is loaded according to an embodiment of the present disclosure. The image forming apparatus 10 displays the screen illustrated in FIG. 20 in S21, S25, and S30 of FIG. 11. The screen illustrated in FIG. 20 is a screen that prompts the operator 43 to scan a certificate document and guides, in accordance with the form associated with the identification information (0, 1, 2, . . . ) of the workflow, the user (such as the operator 43) so that the user scans a document to be scanned.

In the case where the number of to-be-scanned documents associated with the form is one (for example, one certificate document), the image forming apparatus 10 displays the guidance screen illustrated in FIG. 20 once. After the document is scanned, the image forming apparatus 10 changes the screen to the next screen (a next operation screen including a preview screen illustrated in FIG. 21 or the like). In the case where there are a plurality of to-be-scanned documents (for example, two application documents and three certificate documents), the image forming apparatus 10 displays the guidance screen five times. The guidance screen includes the type of the to-be-scanned document (such as an identification card), and the image forming apparatus 10 sequentially displays the guidance screen while changing the type each time scanning is performed. FIG. 20 illustrates an example of the scan guidance screen for the first scan (1/3) performed in the case where the number of to-be-scanned documents is three. In response to a "Skip" button being pressed, scanning of the target document is skipped and a screen prompting scanning of the next document is displayed. Note that each time the document is scanned, the preview screen in which the image of the document scanned at that time alone is superimposed on the mount image (the image of the application document registered in association with the form) may be displayed between the scan guidance screens and then the following scan may be continued. In response to the "Skip" button being pressed, an image of a frame that represents a location at which the image of the document is to be superimposed if the document is scanned may be superimposed and displayed in the preview screen.

Figure 21:
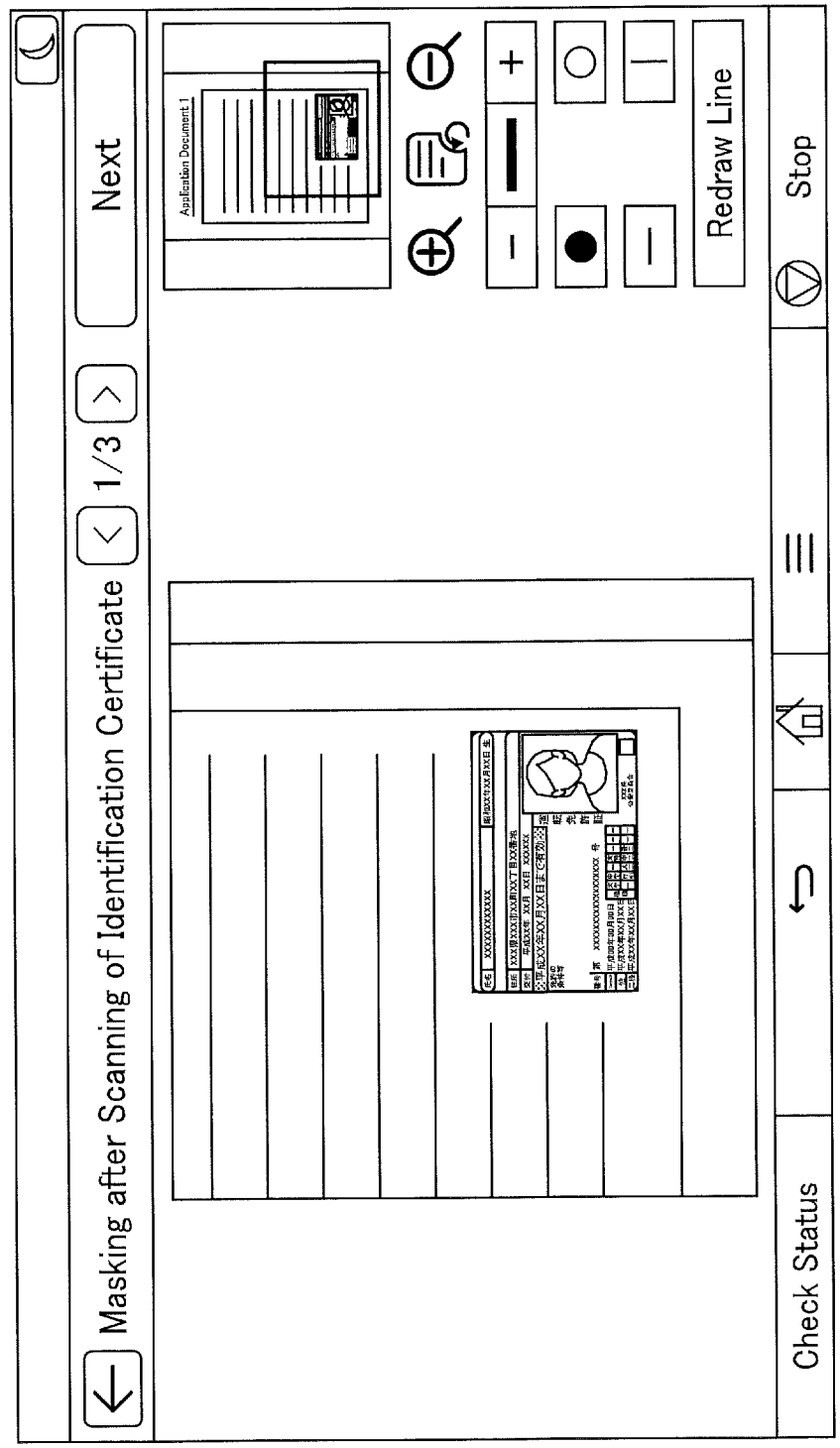
FIG. 21 illustrates an example of an output image preview and masking editing screen displayed after scanning according to an embodiment of the present disclosure.

FIG. 21 illustrates an example of an output image preview and masking editing screen displayed after scanning according to an embodiment of the present disclosure. In response to scanning the certificate document (in the case of the pattern 0 and the pattern 1) or scanning the filled-in application document and the certificate document (in the case of the pattern 2), the image forming apparatus 10 displays the screen illustrated in FIG. 21 in S35, S36, and S37 of FIG. 11.

FIG. 21 illustrates a screen in which the image of the document scanned in the scan guidance screen illustrated in FIG. 20 is checked (in the case where a plurality of documents are scanned, a superimposition result of the plurality of images is ultimately checked) and masking is edited. If mask information is registered in association with the selected form in the screen on the right side in FIG. 17, the masked image is displayed, edited, or deleted, and additional masking processing can be performed. The additional masking processing can be performed using following buttons. With a button b1, black is selectable as the color for the masked region. With a button b2, white is selectable as the color for the masked region. With a button b3, a lateral masked region is addable using the selected color. With a button b4, a vertical masked region is addable using the selected color. With a "Redraw Line" button b5, the state is returned to the previous state. With a button (leftwards arrow) b6 and a button (rightwards arrow) b7, corresponding position in the plurality of certificate documents can be displayed in an enlarged manner. This effectively makes it easier to mask the personal information in the certificate document.

Note that the content displayed in the screen illustrated in FIG. 21 changes depending on the pattern.

In the case of the pattern 0, a yet-to-be-filled-in application document is displayed.

In the case of the pattern 1, a yet-to-be-filled-in application document is displayed.

In the case of the pattern 2, a filled-in application document is displayed.

Figure 22B:
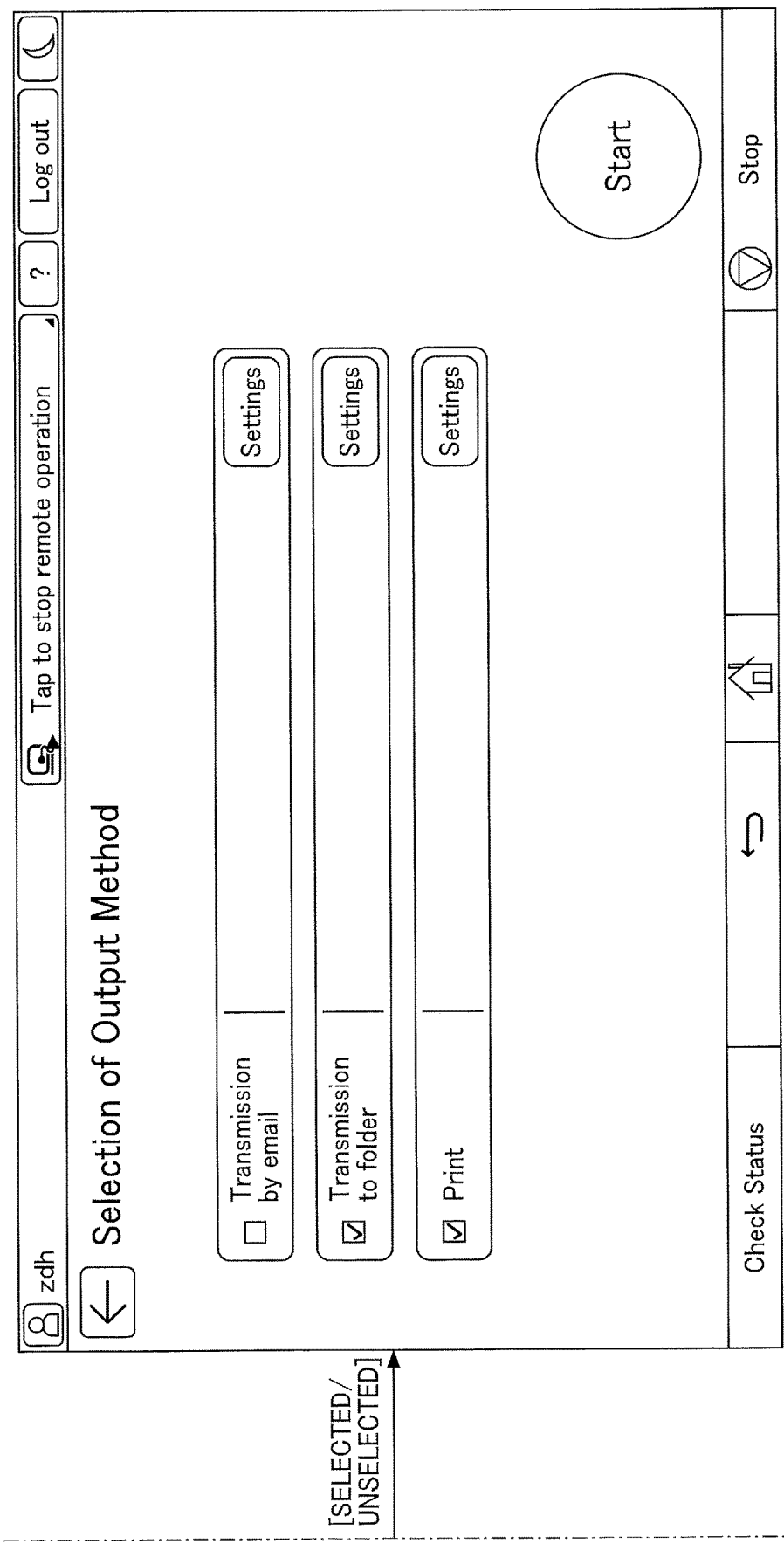

FIG. 22 illustrates an example of an output method selection screen displayed after a form is loaded according to an embodiment of the present disclosure. That is, FIG. 22 illustrates a screen that allows the operator 43 to select an output method (that is, S40 of FIG. 11). For example, transmission by email, transmission to folder, and print can be displayed as the output methods.

The screen illustrated in FIG. 22 includes a "Settings" button for each output method. With this button, print settings (for color, color density, size, punching, and so on) and transmission settings (for an address or a Uniform Resource Locator (URL) serving as a transmission destination and for data format settings of PDF or JPEG) can be made. In addition, a "Start" button is a button for starting the output based on the settings made for each output method using all the output methods (printing and transmission) checked with the check buttons.

As described above, in one embodiment of the present disclosure, the mount image of an application document registered as a form is used for alignment of a certificate document and another piece of data is used at the time of output. Thus, various workflows can be handled.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

In one embodiment, the present invention resides in a method performed by an image forming apparatus, the method comprising: scanning a first document; disposing an image of the scanned first document at a predetermined location in accordance with a form including an image of a second document and information on a location at which the image of the first document is to be disposed in the image of the second document; combining the disposed image of the first document and another image different from the image of the second document included in the form to generate an output image; and outputting the output image.

In one embodiment, the present invention resides in a program, stored in a non-transitory recording medium, which causes an apparatus (such as an image forming apparatus) to: scan a first document, dispose an image of the scanned first document at a predetermined location in accordance with a form including an image of a second document and information on the predetermined location at which the image of the first document is to be disposed in the image of the second document, combine the disposed image of the first document and another image different from the image of the second document included in the form to generate an output image, and output the output image.

For example, the program causes the apparatus to display, on a display, a screen for registering the form in which the image of the first document is disposed in the image of the second document.

In another example, the program causes the apparatus to set the image of the first document not to be displayed and indicate the location at which the image of the first document is disposed.

In another example, the program causes the apparatus to correct the output image in a case where the image of the second document that is yet to be filled in and is included in the form and the image of the second document that has been filled in have different sizes.

In another example, the program causes the apparatus to verify a printing privilege of a user, and change the printing privilege of the user from a privilege for monochrome printing to a privilege for color printing in a case where a verification result indicates that the printing privilege of the user is the privilege for monochrome printing.

In another example, the program causes the apparatus to correct a setting value of the form in response to determining that the image forming apparatus is unable to cam/out an operation according to a setting indicated by the form.

In another example, the program causes the apparatus to store data of the form in a memory, and output the data of the form to another image forming apparatus or a server.

In another example, the program causes the apparatus to register in advance a size of the first document.

In another example, the program causes the apparatus to determine a combination method used for the output image in accordance with a compression scheme of the image of the first document and a compression scheme of the image of the second document.

In another example, the program causes the apparatus to generate the output image having a layered structure of the image of the first image and the image of the second document.

In another example, when the first document is a certificate document, and the second document is an application document, the program causes the apparatus to register one or more forms as one or more workflows each for disposing one or more certificate documents in one or more application documents and outputting the output image, the certificate document being one of the one or more certificate documents, the application document being one of the one or more application documents, and accept selection of one workflow from among the one or more registered workflows.

In another example, the program causes the apparatus to, in a case where the selected workflow is a first workflow for printing the output image such that the certificate document is disposed at the predetermined location of a printed sheet, store the image of the scanned certificate document, use an image in which the image of the scanned certificate document is disposed, in accordance with information on a location set in a form corresponding to the selected workflow, at the predetermined location in the image of the application document registered in advance to display a preview screen, and print the image of the scanned certificate document at the predetermined location of the printed sheet.

In another example, the program causes the apparatus to, in a case where the selected workflow is a second workflow for printing, on a blank sheet yet to be subjected to printing, the application document that has been filled in and the certificate document disposed at the predetermined location of the application document, store the image of the scanned certificate document and the image of the scanned application document that has been filled in, use an image in which the image of the scanned certificate document is disposed, in accordance with information on a location set in a form corresponding to the selected workflow, at the predetermined location in the image of the scanned application document that has been filled in to display a preview screen, and print, on a blank sheet yet to be subjected to printing, the image in which the image of the scanned certificate document is disposed at the predetermined location in the image of the scanned application document that has been filled in.

In another example, the printed sheet is a special sheet having a measure for copy prohibition, the blank sheet yet to be subjected to printing is an ordinary blank sheet, the application document to be printed on the blank sheet yet to be subjected to printing is the application document that has been filled in. The program causes the apparatus to print the image using the special sheet as a recording medium in a case where the selected workflow is the first workflow, and print, on the ordinary blank sheet, the application document that has been filled in and the certificate document disposed at the predetermined location in the application document in a case where the selected workflow is the second workflow.

The invention claimed is:

1. An image forming apparatus comprising:
    circuitry configured to
        scan a first document,
        dispose an image of the scanned first document at a predetermined location in accordance with a form including an image of a second document and information on the predetermined location at which the image of the first document is to be disposed in the image of the second document,
        combine the disposed image of the first document and another image different from the image of the second document included in the form to generate an output image, and
        output the output image, wherein
    the form includes information on a pattern of a workflow, and
    the circuitry scans, combines, and outputs, in accordance with the pattern.

2. The image forming apparatus according to claim 1, wherein the circuitry is configured to display, on a display, a screen for registering the form in which the image of the first document is disposed in the image of the second document.

3. The image forming apparatus according to claim 2, wherein the circuitry is configured to set the image of the first document not to be displayed and indicate the location at which the image of the first document is disposed.

4. The image forming apparatus according to claim 1, wherein the other image is an image based on blank sheet data.

5. The image forming apparatus according to claim 1, wherein the other image is an image of the second document that has been filled in.

6. The image forming apparatus according to claim 5, wherein the circuitry is configured to correct the output image in a case where the image of the second document that is yet to be filled in and is included in the form and the image of the second document that has been filled in have different sizes.

7. The image forming apparatus according to claim 1, wherein the form includes information on a region to be masked.

8. The image forming apparatus according to claim 1, wherein
    the outputting of image includes any of printing the output image, transmitting the output image by email, or storing the output image in a storage device, and
    the circuitry is configured to enable or disable each of the printing, the transmitting, and the storing.

9. The image forming apparatus according to claim 1, wherein the circuitry is configured to
    verify a printing privilege of a user, and
    change the printing privilege of the user from a privilege for monochrome printing to a privilege for color printing in a case where a verification result indicates that the printing privilege of the user is the privilege for monochrome printing.

10. The image forming apparatus according to claim 1, wherein the circuitry is configured to correct a setting value of the form in response to determining that the image forming apparatus is unable to carry out an operation according to a setting indicated by the form.

11. The image forming apparatus according to claim 1, further comprising:
    a memory that stores data of the form, wherein
    the circuitry is configured to output the data of the form to another image foliating apparatus or a server.

12. The image forming apparatus according to claim 1, wherein the circuitry is configured to register in advance a size of the first document.

13. The image forming apparatus according to claim 1, wherein the circuitry is configured to determine a combination method used for the output image in accordance with a compression scheme of the image of the first document and a compression scheme of the image of the second document.

14. The image forming apparatus according to claim 1, wherein the circuitry is configured to generate the output image having a layered structure of the image of the first image and the image of the second document.

15. The image forming apparatus according to claim 1, wherein
the first document is a certificate document,
the second document is an application document, and
the circuitry is configured to
register one or more forms as one or more workflows each for disposing one or more certificate documents in one or more application documents and outputting the output image, the certificate document being one of the one or more certificate documents, the application document being one of the one or more application documents, and
accept selection of one workflow from among the one or more registered workflows.

16. The image forming apparatus according to claim 15, wherein the circuitry is configured to, in a case where the selected workflow is a first workflow for printing the output image such that the certificate document is disposed at the predetermined location of a printed sheet,
store the image of the scanned certificate document,
use an image in which the image of the scanned certificate document is disposed, in accordance with information on a location set in a form corresponding to the selected workflow, at the predetermined location in the image of the application document registered in advance to display a preview screen, and
print the image of the scanned certificate document at the predetermined location of the printed sheet.

17. The image forming apparatus according to claim 16, wherein the circuitry is configured to, in a case where the selected workflow is a second workflow for printing, on a blank sheet yet to be subjected to printing, the application document that has been filled in and the certificate document disposed at the predetermined location of the application document,
store the image of the scanned certificate document and the image of the scanned application document that has been filled in,
use an image in which the image of the scanned certificate document is disposed, in accordance with information on a location set in a form corresponding to the selected workflow, at the predetermined location in the image of the scanned application document that has been filled in to display a preview screen, and
print, on a blank sheet yet to be subjected to printing, the image in which the image of the scanned certificate document is disposed at the predetermined location in the image of the scanned application document that has been filled in.

18. The image forming apparatus according to claim 17, wherein
the printed sheet is a special sheet having a measure for copy prohibition,
the blank sheet yet to be subjected to printing is an ordinary blank sheet,
the application document to be printed on the blank sheet yet to be subjected to printing is the application document that has been filled in, and
the circuitry is configured to
print the image using the special sheet as a recording medium in a case where the selected workflow is the first workflow, and
print, on the ordinary blank sheet, the application document that has been filled in and the certificate document disposed at the predetermined location in the application document in a case where the selected workflow is the second workflow.

19. A non-transitory recording medium which, when executed by one or more processors, cause the processors to perform a method comprising:
scanning a first document;
disposing an image of the scanned first document at a predetermined location in accordance with a form including an image of a second document and information on a location at which the image of the first document is to be disposed in the image of the second document,
combining the disposed image of the first document and another image different from the image of the second document included in the form to generate an output image; and
outputting the output image, wherein
the form includes information on a pattern of a workflow, and
the processors scan, combine, and output, in accordance with the pattern.

* * * * *